(12) United States Patent
Ji

(10) Patent No.: US 11,899,941 B2
(45) Date of Patent: Feb. 13, 2024

(54) STORAGE DEVICE AND OPERATING METHOD THEREOF

(71) Applicant: Samsung Electronics Co., Ltd., Suwon-si (KR)

(72) Inventor: Soo-Young Ji, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 5 days.

(21) Appl. No.: 17/874,734

(22) Filed: Jul. 27, 2022

(65) Prior Publication Data
US 2023/0141583 A1 May 11, 2023

(30) Foreign Application Priority Data

Nov. 11, 2021 (KR) .................. 10-2021-0154785
Jan. 10, 2022 (KR) .................. 10-2022-0003400

(51) Int. Cl.
*G06F 3/06* (2006.01)
(52) U.S. Cl.
CPC .......... *G06F 3/0619* (2013.01); *G06F 3/0653* (2013.01); *G06F 3/0679* (2013.01)
(58) Field of Classification Search
CPC ..... G06F 3/0619; G06F 3/0653; G06F 3/0679
See application file for complete search history.

(56) References Cited

U.S. PATENT DOCUMENTS

| | | | |
|---|---|---|---|
| 9,356,628 B2 | 5/2016 | Reinart | |
| 9,595,979 B2 | 3/2017 | Blaum et al. | |
| 10,014,881 B2 | 7/2018 | Blaum et al. | |
| 10,310,736 B1 | 6/2019 | Yu et al. | |
| 10,545,823 B2 | 1/2020 | Pydipaty et al. | |
| 10,838,885 B2 | 11/2020 | Olarig et al. | |
| 2018/0321844 A1 | 11/2018 | Benisty | |
| 2019/0278514 A1 | 9/2019 | Chaturvedi et al. | |
| 2019/0303007 A1 | 10/2019 | Hong et al. | |
| 2020/0401480 A1 | 12/2020 | Zeng et al. | |
| 2021/0117123 A1 | 4/2021 | Jakowski et al. | |
| 2021/0191628 A1 | 6/2021 | Iwase | |
| 2022/0375274 A1* | 11/2022 | Chen ...................... | G07C 5/008 |
| 2023/0026222 A1* | 1/2023 | Kluftinger ............ | G08C 19/00 |

FOREIGN PATENT DOCUMENTS

KR 10-1533340 B1 7/2015

OTHER PUBLICATIONS

European Office Action dated Apr. 5, 2023 for corresponding European Application No. 22188494.3.
European Search Report dated Mar. 24, 2023 for corresponding European Application No. 22188494.3.

* cited by examiner

*Primary Examiner* — Baboucarr Faal
(74) *Attorney, Agent, or Firm* — Harness, Dickey & Pierce, P.L.C.

(57) ABSTRACT

A storage device is provided. A storage device includes a non-volatile memory including a plurality of memory segments, and a storage controller connected to the non-volatile memory through a plurality of channels, each of the plurality of channels connected to a respective one of the plurality of memory segments such that each of the plurality of channels has a respective associated memory segment, wherein the storage controller is configured to generate parity according to speed information received from a host with respect to data to be written to the non-volatile memory and store the parity in at least one of the memory segments.

20 Claims, 14 Drawing Sheets

STORAGE DEVICE AND OPERATING METHOD THEREOF

CROSS-REFERENCE TO RELATED APPLICATION

This application claims priority from Korean Patent Application No. 10-2021-0154785 filed on Nov. 11, 2021, and Korean Patent Application No. 10-2022-0003400 filed on Jan. 10, 2022 in the Korean Intellectual Property Office, and all the benefits accruing therefrom under 35 U.S.C. 119, the contents of which in its entirety are herein incorporated by reference.

BACKGROUND

1. Technical Field

The present disclosure relates to a storage device and an operating method thereof.

2. Description of the Related Art

Various electronic devices in a vehicle's infotainment system and an autonomous driving system include semiconductor devices, such as a non-volatile memory, a working memory (e.g., dynamic random access memory (DRAM)), and an application processor, in order to drive various application programs.

As a nonvolatile memory, a flash memory may retain the stored data even when the power is turned off. Storage devices having flash memories, such as an embedded multimedia card (eMMC), a universal flash storage (UFS), a solid-state drive (SSD), and a memory card, are used to store or move large amounts of data.

In such a storage device, parity may be stored in the storage device together with data for the purpose of correcting data errors or recovering data. Meanwhile, there is an increasing need to safely store or recover data in a storage device even when a traveling speed of a vehicle changes rapidly.

SUMMARY

Example embodiments of the present disclosure provide a storage device capable of safely storing data during an emergency state.

Example embodiments of the present disclosure also provide a method of operating a storage device capable of safely storing data during an emergency state.

However, example embodiments of the present disclosure are not restricted to those set forth herein. The above and other example embodiments of the present disclosure will become more apparent to one of ordinary skill in the art to which the present disclosure pertains by referencing the detailed description of the present disclosure given below.

According to an example embodiment of the present disclosure, there is a storage device comprising a non-volatile memory including a plurality of memory segments, and a storage controller connected to the non-volatile memory through a plurality of channels, each of the plurality of channels connected to a respective one of the plurality of memory segments such that each of the plurality of channels has a respective associated memory segment wherein the storage controller is configured to generate parity according to speed information received from a host with respect to data to be written to the non-volatile memory and store the parity in the plurality of memory segments.

According to the aforementioned and other example embodiments of the present disclosure, there is provided a storage device comprising a non-volatile memory including a plurality of memory segments, and a storage controller connected to the non-volatile memory through a plurality of channels and configured to acquire speed information from an outside and generate parity according to the speed information, each of the plurality of channels connected to a respective one of the plurality of memory segments such that each of the plurality of channels has a respective associated memory segment wherein the storage controller is configured to generate erasure code data by performing erasure coding on original data and to generate parity according to the speed information with respect to the erasure code data and store the parity in the plurality of memory segments.

According to the aforementioned and other example embodiments of the present disclosure, there is provided a storage device comprising a non-volatile memory including a plurality of memory segments, and a storage controller connected to the non-volatile memory through a plurality of channels, each of the plurality of channels connected to a respective one of the plurality of memory segments such that each of the plurality of channels has a respective associated memory segment, wherein the storage controller is configured to receive speed information from a host and generate parity according to the speed information, and including a host interface configured to receive data to be written to the non-volatile memory from the host and transfer data read from the non-volatile memory to the host, and a memory interface configured to transfer data to be written to the non-volatile memory or receive data read from the non-volatile memory, and as a speed change included in the speed information increases, an amount of data transferred and received by the memory interface increases more than an amount of data transferred and received by the host interface.

It should be noted that the effects of the present disclosure are not limited to those described above, and other effects of the present disclosure will be apparent from the following description.

BRIEF DESCRIPTION OF THE DRAWINGS

The above and other features of the present disclosure will become more apparent by describing in detail example embodiments thereof with reference to the attached drawings, in which.

DETAILED DESCRIPTION OF THE EXAMPLE EMBODIMENTS

Figure 1:
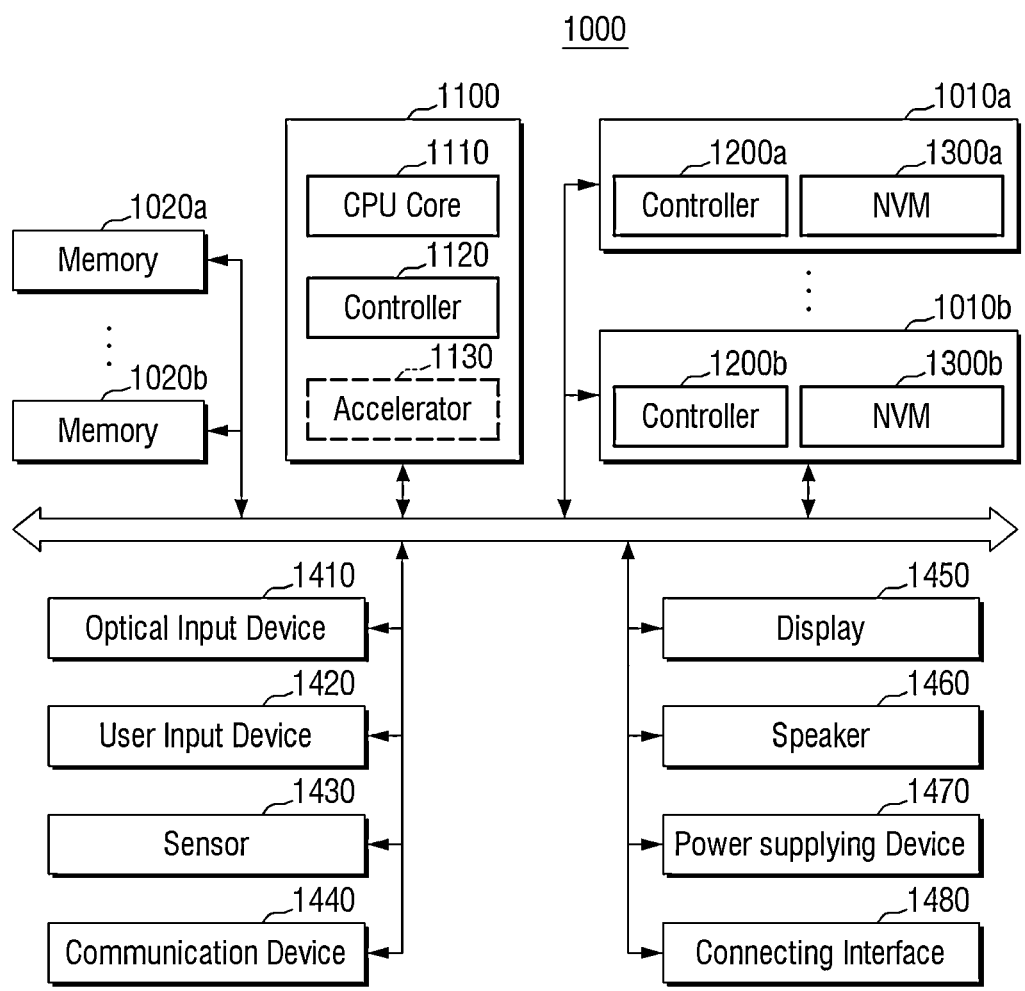
FIG. 1 is a block diagram illustrating an electronic system according to some example embodiments of the present disclosure.

Hereinafter, example embodiments of the present disclosure will be described with reference to the attached drawings. In the explanation of FIGS. 1 to 14, the same reference numerals are used to refer to substantially the same components, and the repeated explanation of the components will not be provided. Also, similar reference numerals are used to refer to similar components throughout the several diagrams of the present disclosure.

FIG. 1 is a block diagram illustrating an electronic system according to some example embodiments of the present disclosure.

A system 1000 of FIG. 1 may be a mobile system, such as a mobile phone, a smartphone, a tablet personal computer (PC), a wearable device, a healthcare device, or an Internet-of-things (IoT) device. However, the system 1000 of FIG. 1 is not necessarily limited to a mobile system, and may be a PC, a laptop computer, a server, a media player, or an automotive device, such as a navigation system.

Referring to FIG. 1, the system 1000 may include a main processor 1100, memories 1020a and 1020b, and storage devices 1010a and 1010b, and may further include one or more of an optical input device 1410, a user input device 1420, a sensor 1430, a communication device 1440, a display 1450, a speaker 1460, a power supplying device 1470, and a connecting interface 1480.

The main processor 1100 may control the overall operations of the system 1000, more specifically, operations of other components constituting the system 1000. The main processor 1100 may be implemented as a general-purpose processor, an exclusive processor, an application processor, or the like.

The main processor 1100 may include one or more central processing unit (CPU) cores 1110, and may further include a controller 1120 for controlling the memories 1020a and 1020b and/or the storage devices 1010a and 1010b. According to some example embodiments, the main processor 1100 may further include an accelerator block 1130 which is an exclusive circuit for high-speed data computation such as Artificial Intelligence (AI) data computation. The accelerator block 1130 may include a graphics processing unit (GPU), a neural processing unit (NPU), a data processing unit (DPU), and/or the like, and may be realized as a separate chip that is physically separated from other components of the main processor 1100.

The memories 1020a and 1020b may be used as a main memory device of the system 1000. Although the memories 1020a and 1020b may include volatile memories, such as static RAM (SRAM), DRAM, and/or the like, the memories 1020a and 1020b may include non-volatile memories, such as flash memory, phase RAM (PRAM), resistive RAM (RRAM), and/or the like. The memories 1020a and 1020b may be embodied in the same package as the main processor 1100.

The storage devices 1010a and 1010b may serve as non-volatile storage devices configured to store data regardless of whether power is supplied thereto, and have larger storage capacity than the memories 1020a and 1020b. The storage devices 1010a and 1010b may respectively include storage controllers 1200a and 1200b and non-volatile memories (NVMs) 1300a and 1300b configured to store data under the control of the storage controllers 1200a and 1200b. Although the NVMs 1300a and 1300b may include V-NAND flash memories having a two-dimensional (2D) structure or a three-dimensional (3D) structure, the NVMs 1300a and 1300b may include other types of NVMs, such as PRAM and/or RRAM.

The storage devices 1010a and 1010b may be physically separated from the main processor 1100 and included in the system 1000 or embodied in the same package as the main processor 1100. In addition, the storage devices 1010a and 1010b may have types of memory cards and be removably combined with other components of the system 1000 through an interface, such as the connecting interface 1480 that will be described below. The storage devices 1010a and 1010b may be devices to which a standard protocol, such as a universal flash storage (UFS), is applied, without being limited thereto.

The optical input device 1410 may capture still images or moving images. The optical input device 1410 may include a camera, a camcorder, a webcam, and/or the like.

The user input device 1420 may receive various types of data input by a user of the system 1000 and include a touch pad, a keypad, a keyboard, a mouse, and/or a microphone.

The sensor 1430 may detect various types of physical quantities, which may be obtained from the outside of the system 1000, and convert the detected physical quantities into electric signals. The sensor 1430 may include a temperature sensor, a pressure sensor, an illuminance sensor, a position sensor, an acceleration sensor, a biosensor, and/or a gyroscope sensor.

The communication device 1440 may transfer and receive signals between other devices outside the system 1000 according to various communication protocols. The communication device 1440 may include an antenna, a transceiver, and/or a modem.

The display 1450 and the speaker 1460 may serve as output devices configured to respectively output visual information and auditory information to the user of the system 1000.

The power supplying device 1470 may appropriately convert power supplied from a battery (not shown) embedded in the system 1000 and/or an external power source, and supply the converted power to each of components of the system 1000.

The connecting interface 1480 may provide connection between the system 1000 and an external device, which is connected to the system 1000 and capable of transferring and receiving data to and from the system 1000. The connecting interface 1480 may be embodied by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVM express (NVMe), IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

Figure 2:
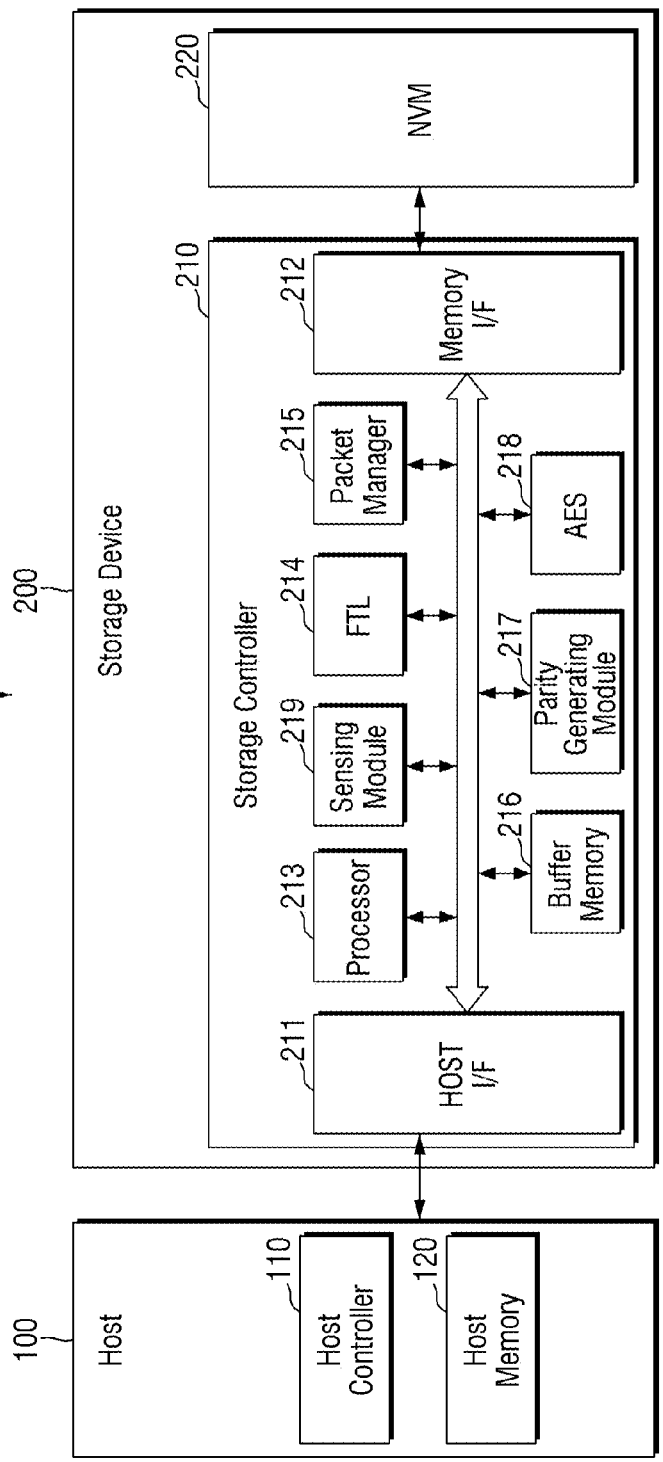
FIG. 2 is a block diagram illustrating a storage system according to some example embodiments of the present disclosure.

FIG. 2 is a block diagram illustrating a storage system according to some example embodiments of the present disclosure.

A storage system 10 may include a host device 100 and a storage device 200. Also, the storage device 200 may include a storage controller 210 and an NVM 220. In addition, in some example embodiments, the host device 100 may include a host controller 110 and a host memory 120. The host memory 120 may serve as a buffer memory configured to temporarily store data to be transferred to the storage device 200 or data received from the storage device 200.

The storage device 200 may include storage media configured to store data in response to requests from the host 100. For example, the storage device 200 may include at least one of a solid state drive (SSD), an embedded memory, or a removable external memory. When the storage device 200 is an SSD, the storage device 200 may be a device that conforms to an NVMe standard.

When the storage device 200 is an embedded memory or an external memory, the storage device 200 may be a device that conforms to UFS standard or an eMMC standard. Each of the host 100 and the storage device 200 may generate a packet according to an adopted standard protocol and transfer the packet.

When the NVM 220 of the storage device 200 includes a flash memory, the flash memory may include a 2D NAND memory array or a 3D (or vertical) NAND (VNAND) memory array. As another example, the storage device 200 may include various other kinds of NVMs. For example, the storage device 200 may include magnetic random access memory (MRAM), spin-transfer torque MRAM, conductive bridging RAM (CBRAM), ferroelectric RAM (FRAM), PRAM, RRAM, and various other types of memories.

In some example embodiments, the host controller 110 and the host memory 130 may be embodied as separate semiconductor chips. Alternatively, in some example embodiments, the host controller 110 and the host memory 130 may be integrated in the same semiconductor chip. As an example, the host controller 110 may be any one of a plurality of modules included in an application processor (AP). The AP may be embodied as a System on Chip (SoC). Further, the host memory 120 may be an embedded memory included in the AP or an NVM or memory module located outside the AP.

The host controller 110 may manage an operation of storing data (e.g., write data) of a buffer region in the NVM 220 or an operation of storing data (e.g., read data) of the NVM 220 in the buffer region.

The storage controller 210 may include a host interface 211, a memory interface 212, and a processor 213. Further, the storage controller 210 may further include a flash translation layer (FTL) 214, a packet manager 215, a buffer memory 216, a parity generator module 217, an advanced encryption standard (AES) engine 218, and a sensing module 219.

The storage controller 210 may further include a working memory (not shown) in which the FTL 213 is loaded. The processor 213 may execute the FTL 214 to control data write and read operations on the NVM 220.

The host interface 211 may transfer and receive packets to and from the host device 100. A packet transferred from the host device 100 to the host interface 211 may include a command or data to be written to the NVM 220. A packet transferred from the host interface 211 to the host device 100 may include a response to the command or data read from the NVM 220.

The memory interface 212 may transfer data to be written to the NVM 220 to the NVM 220 or receive data read from the NVM 220. The memory interface 212 may be configured to comply with a standard protocol, such as Toggle or open NAND flash interface (ONFI).

The FTL 214 may perform various functions, such as an address mapping operation, a wear-leveling operation, and a garbage collection operation. The address mapping operation may be an operation of converting a logical address received from the host into a physical address used to actually store data in the NVM 220. The wear-leveling operation may be a technique for preventing excessive deterioration of a specific block by allowing blocks of the NVM 220 to be uniformly used. As an example, the wear-leveling operation may be embodied using a firmware technique that balances erase counts of physical blocks. The garbage collection operation may be a technique for ensuring usable capacity in the NVM 220 by erasing an existing block after copying valid data of the existing block to a new block.

The packet manager 215 may generate a packet according to a protocol of an interface, which consents to the host device 100, or parse various types of information from the packet received from the host device 100. In addition, the buffer memory 216 may temporarily store data to be written to the NVM 220 or data to be read from the NVM 220. Although the buffer memory 216 may be a component included in the storage controller 210, the buffer memory 216 may be outside the storage controller 210.

The parity generator module 217 may generate parity to perform error detection and correction operations on read data read from the NVM 220. The parity generator module 217 may include an error correction code (ECC) engine. More specifically, the parity generator module 217 may generate parity bits with respect to write data to be written to the NVM 220, and the generated parity bits may be stored in the NVM 220 together with write data. During the reading of data from the NVM 220, the parity generator module 217 may correct an error in the read data by using the parity bits read from the NVM 220 along with the read data, and output error-corrected read data.

The AES engine 218 may perform at least one of an encryption operation and a decryption operation on data input to the storage controller 210 by using a symmetric-key algorithm.

The sensing module 219 may receive speed information from the host device 100. The speed information may contain information on speed change. The sensing module 219 may be included in a storage device 720 of a vehicle 700 of FIG. 14. An electronic control device 710 of the vehicle 700 may store data in the storage device 720 or read information stored in the storage device 720 according to information acquired through an acquisition device 730, for example, speed information of the vehicle 700.

In some example embodiments, the sensing module 219 may be embodied in hardware and included in the storage controller 210. However, example embodiments are not limited thereto, such that the sensing module 219 may be embodied in software and executed by the processor 213.

A detailed operation of the sensing module 219 will be described further below.

Figure 3:
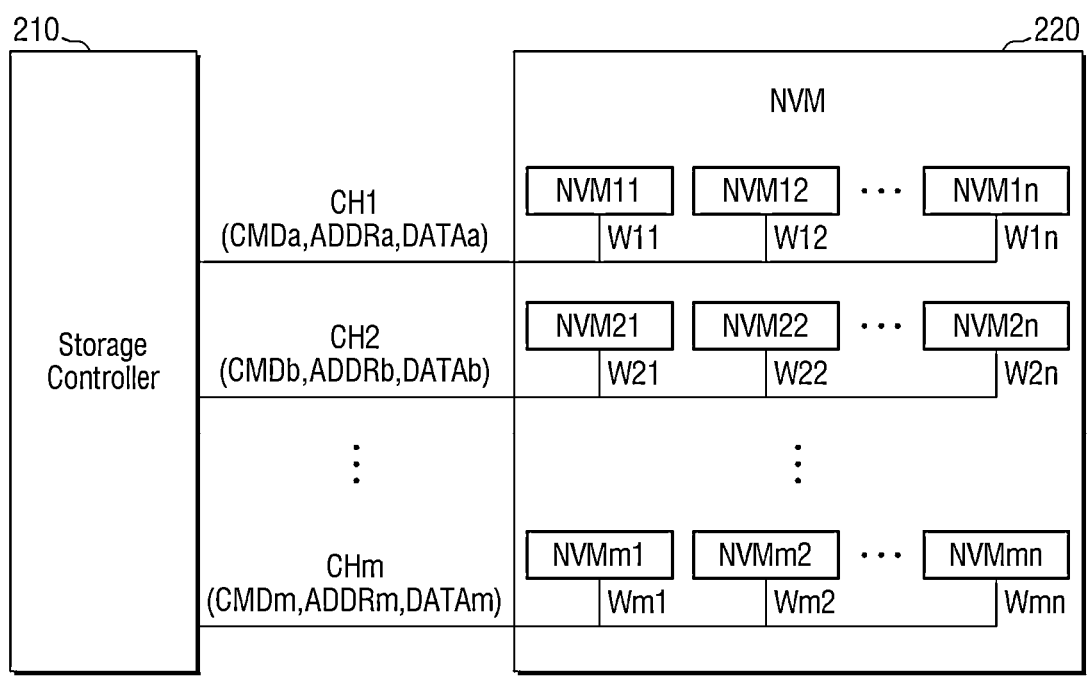
FIG. 3 is a block diagram illustrating the storage controller and the NVM of the storage device of FIG. 2.

FIG. 3 is a block diagram illustrating the storage controller and the NVM of the storage device of FIG. 2.

Referring to FIG. 3, the storage device 200 may include the NVM 220 and the storage controller 210. The storage device 200 may support a plurality of channels CH1 to CHm, and the NVM 220 and the storage controller 210 may be connected through the plurality of channels CH1 to CHm. For example, the storage device 200 may be embodied as a storage device, such as an SSD.

The NVM 220 may include a plurality of NVM devices NVM11 to NVMmn Each of the NVM devices NVM11 to NVMmn may be connected to one of the plurality of channels CH1 to CHm through a way corresponding thereto. For example, the NVM devices NVM11 to NVM1$n$ may be connected to a first channel CH1 through ways W11 to W1n, and the NVM devices NVM21 to NVM2$n$ may be connected to a second channel CH2 through ways W21 to W2$n$. In an example embodiment, each of the NVM devices NVM11 to NVMmn may be embodied as an arbitrary memory unit that may operate according to an individual command from the storage controller 210. For example, each of the NVM devices NVM11 to NVMmn may be embodied as a chip or a die, but the present disclosure is not limited thereto.

The storage controller 210 may transfer and receive signals to and from the NVM 220 through the plurality of channels CH1 to CHm. For example, the storage controller 210 may transfer commands CMDa to CMDm, addresses ADDRa to ADDRm, and data DATAa to DATAm to the NVM 220 through the channels CH1 to CHm or receive the data DATAa to DATAm from the NVM 220.

The storage controller 210 may select one of the NVM devices, which is connected to each of the channels CH1 to CHm (a group of NVM devices connected to one channel may be collectively referred to as a memory segment), by using a corresponding one of the channels CH1 to CHm, and transfer and receive signals to and from the selected NVM device. For example, the storage controller 210 may select the NVM device NVM11 from the NVM devices NVM11 to NVM1$n$ connected to the first channel CH1. The storage controller 210 may transfer the command CMDa, the address ADDRa, and the data DATAa to the selected NVM device NVM11 through the first channel CH1 or receive the data DATAa from the selected NVM device NVM11.

The storage controller 210 may transfer and receive signals to and from the NVM 220 in parallel through different channels. For example, the storage controller 210 may transfer a command CMDb to the NVM 220 through the second channel CH2 while transferring a command CMDa to the NVM 220 through the first channel CH1. For example, the storage controller 210 may receive data DATAb from the NVM 220 through the second channel CH2 while receiving data DATAa from the NVM 220 through the first channel CH1.

The storage controller 210 may control overall operations of the NVM 220. The storage controller 210 may transfer a signal to the channels CH1 to CHm and control each of the NVM devices NVM11 to NVMmn connected to the channels CH1 to CHm. For example, the storage controller 210 may transfer the command CMDa and the address ADDRa to the first channel CH1 and control one selected from the NVM devices NVM11 to NVM1$n$.

Each of the NVM devices NVM11 to NVMmn may operate under the control of the storage controller 210. For example, the NVM device NVM11 may program the data DATAa based on the command CMDa, the address ADDRa, and the data DATAa provided to the first channel CH1. For example, the NVM device NVM21 may read the data DATAb based on the command CMDb and the address ADDb provided to the second channel CH2 and transfer the read data DATAb to the storage controller 210.

Although FIG. 3 illustrates an example in which the NVM 220 communicates with the storage controller 210 through m channels and includes n NVM devices corresponding to each of the channels, the number of channels and the number of NVM devices connected to one channel may be variously changed.

Figure 4:
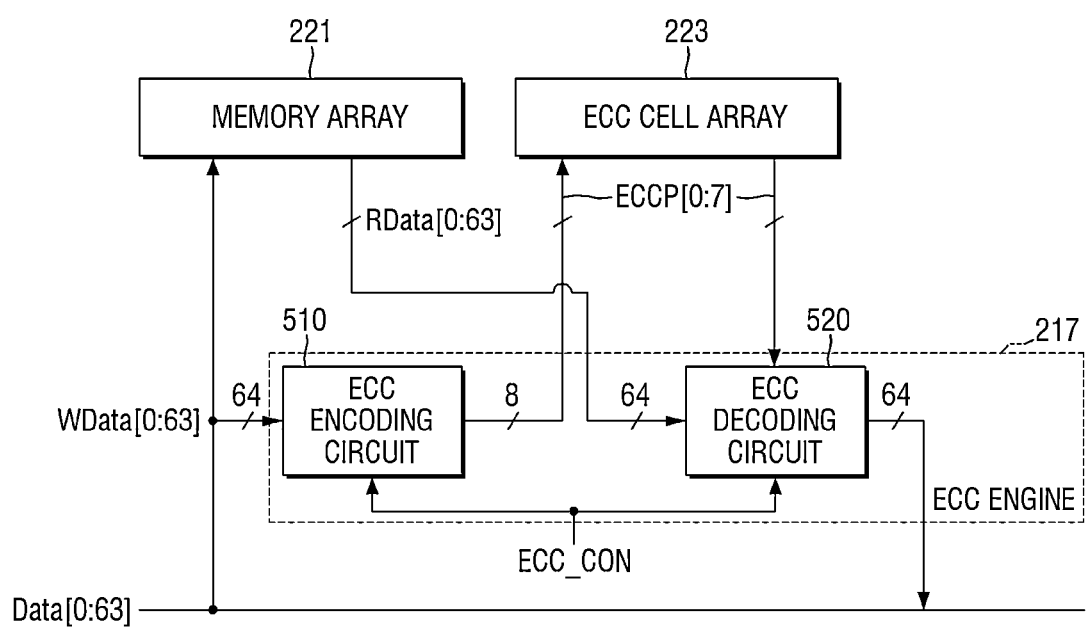
FIG. 4 is a diagram for describing the parity generator module of FIG. 2 in more detail.

FIG. 4 is a diagram for describing the parity generator module of FIG. 2 in more detail.

Referring to FIG. 4, the parity generator module 217 may include an ECC encoding circuit 510 and an ECC decoding circuit 520. The ECC encoding circuit 510 may generate parity bits ECCP[0:7] with respect to write data WData[0:63] to be written to memory cells of a memory cell array 221 in response to an ECC control signal ECC_CON. The parity bits ECCP[0:7] may be stored in an ECC cell array 223. According to an example embodiment, the ECC encoding circuit 510 may generate parity bits ECCP[0:7] with respect to the write data WData [0:63] to be written to memory cells including defective cells of the memory cell array 221 in response to the ECC control signal ECC_CON.

In response to the ECC control signal ECC_CON, the ECC decoding circuit 520 may correct error bit data by using read data RData[0:63] read from the memory cells of the memory cell array 221 and the parity bits ECCP[0:7] read from the ECC cell array 223 and may output error-corrected data Data[0:63]. According to an example embodiment, in response to the ECC control signal ECC_CON, the ECC decoding circuit 520 may correct error bit data by using read data RData[0:63] read from the memory cells including defective cells of the memory cell array 221 and the parity bits ECCP[0:7] read from the ECC cell array 223 and may output error-corrected data Data[0:63].

Figure 5:
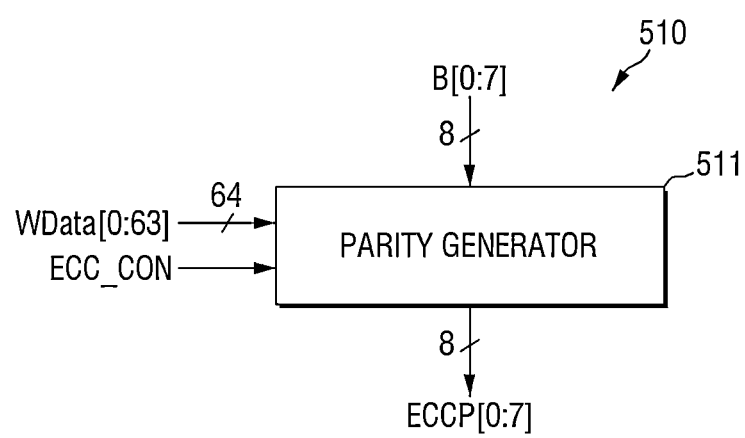
FIG. 5 is a diagram for describing the ECC encoding circuit of FIG. 4.

FIG. 5 is a diagram for describing the ECC encoding circuit of FIG. 4.

Referring to FIG. 5, the ECC encoding circuit 510 may receive write data WData[0:63] in 64 bits and basis bits B [0:7] in response to the ECC control signal ECC_CON. The ECC encoding circuit 510 may include a parity generator 511 configured to generate parity bits ECCP[0:7] by using an XOR array operation. The basis bits B[0:7] are bits for generating the parity bits ECCP[0:7] with respect to the write data WData[0:63] in 64 bits, and may include, for example, b' 00000000 bits. The basis bits B [0:7] may use other bits instead of b' 00000000.

Figure 6:
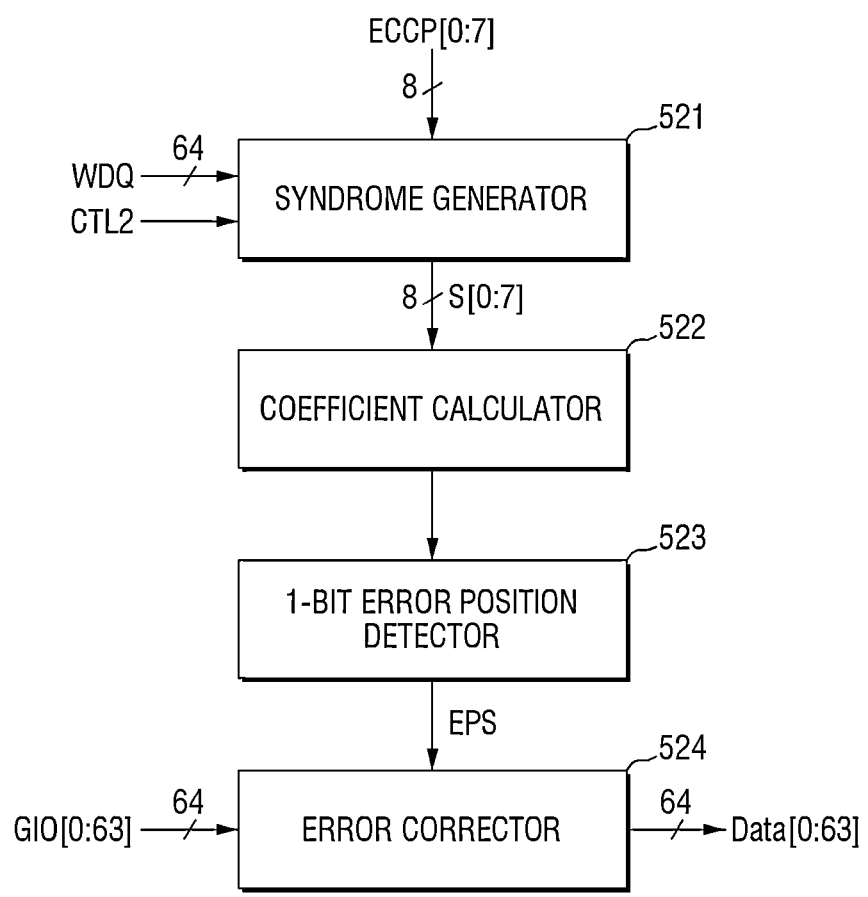
FIG. 6 is a diagram for describing the ECC decoding circuit of FIG. 4.

FIG. 6 is a diagram for describing the ECC decoding circuit of FIG. 4.

Referring to FIG. 6, the ECC decoding circuit 520 may include a syndrome generator 521, a coefficient calculator 522, a 1-bit error position detector 523, and an error corrector 524. In response to the ECC control signal ECC_CON, the syndrome generator 521 may receive the read data in 64 bits and the parity bits ECCP[0:7] in 8 bits and generate syndrome data S[0:7] by using an XOR array operation. The coefficient calculator 522 may calculate a coefficient of an error position equation by using the syndrome data S[0:7]. The error position equation is an equation that uses a reciprocal of an error bit as a root. The 1-bit error position detector 523 may calculate a position of a 1 bit error by using the calculated error position equation. The error corrector 524 may determine the position of the 1-bit error based on a detecting result of the 1-bit error position detector 523. The error corrector 524 may correct an error by reversing a logic value of a bit having the error from among the read data RData[0:63] in 64 bits according to the determined position of the 1-bit error and output the error-corrected data Data[0:64].

Figure 7:
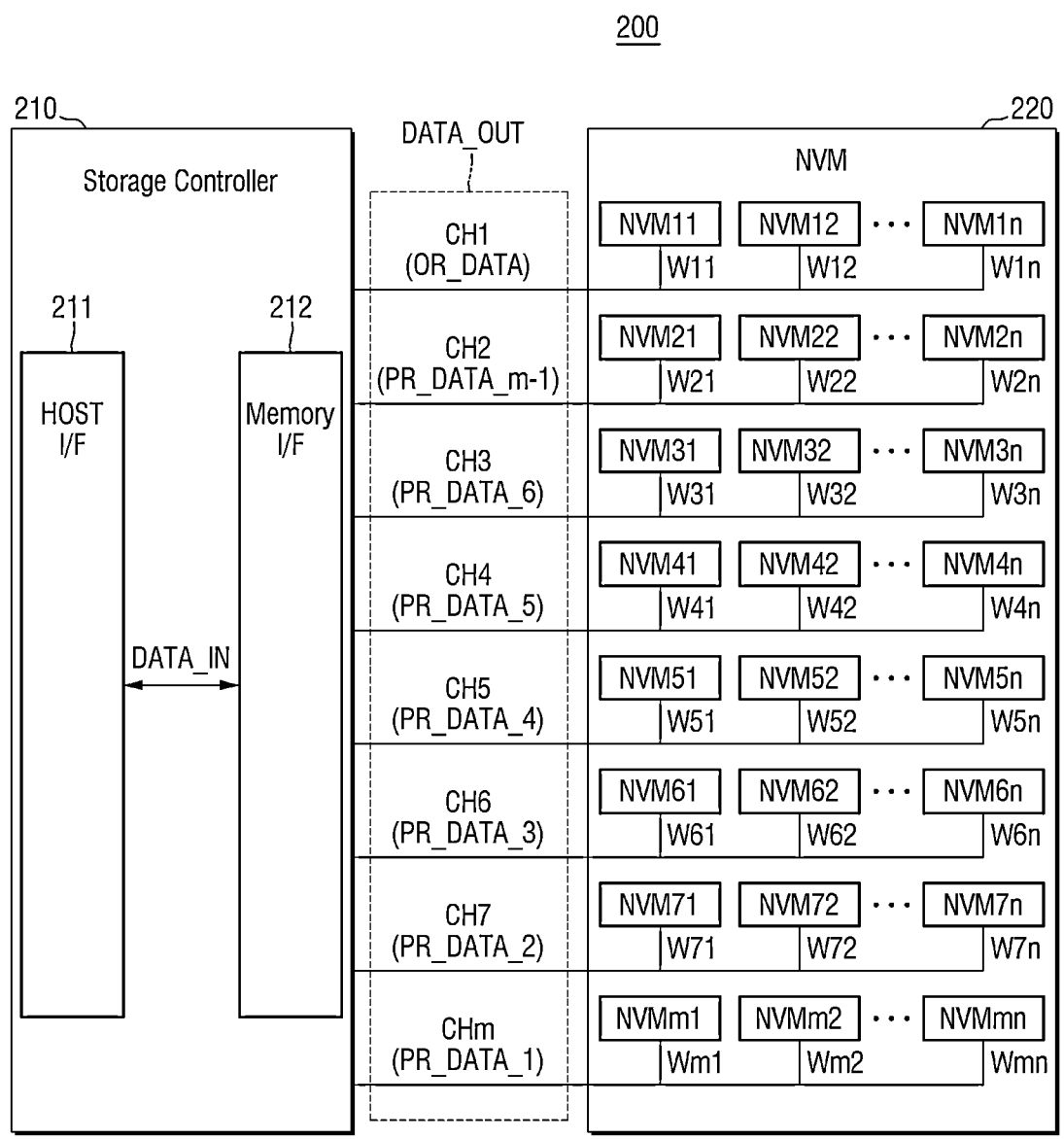
FIGS. 7 and 8 are diagrams for describing data stored in a memory segment the NVM of FIG. 2 according to some example embodiments of the present disclosure.
Figure 8:
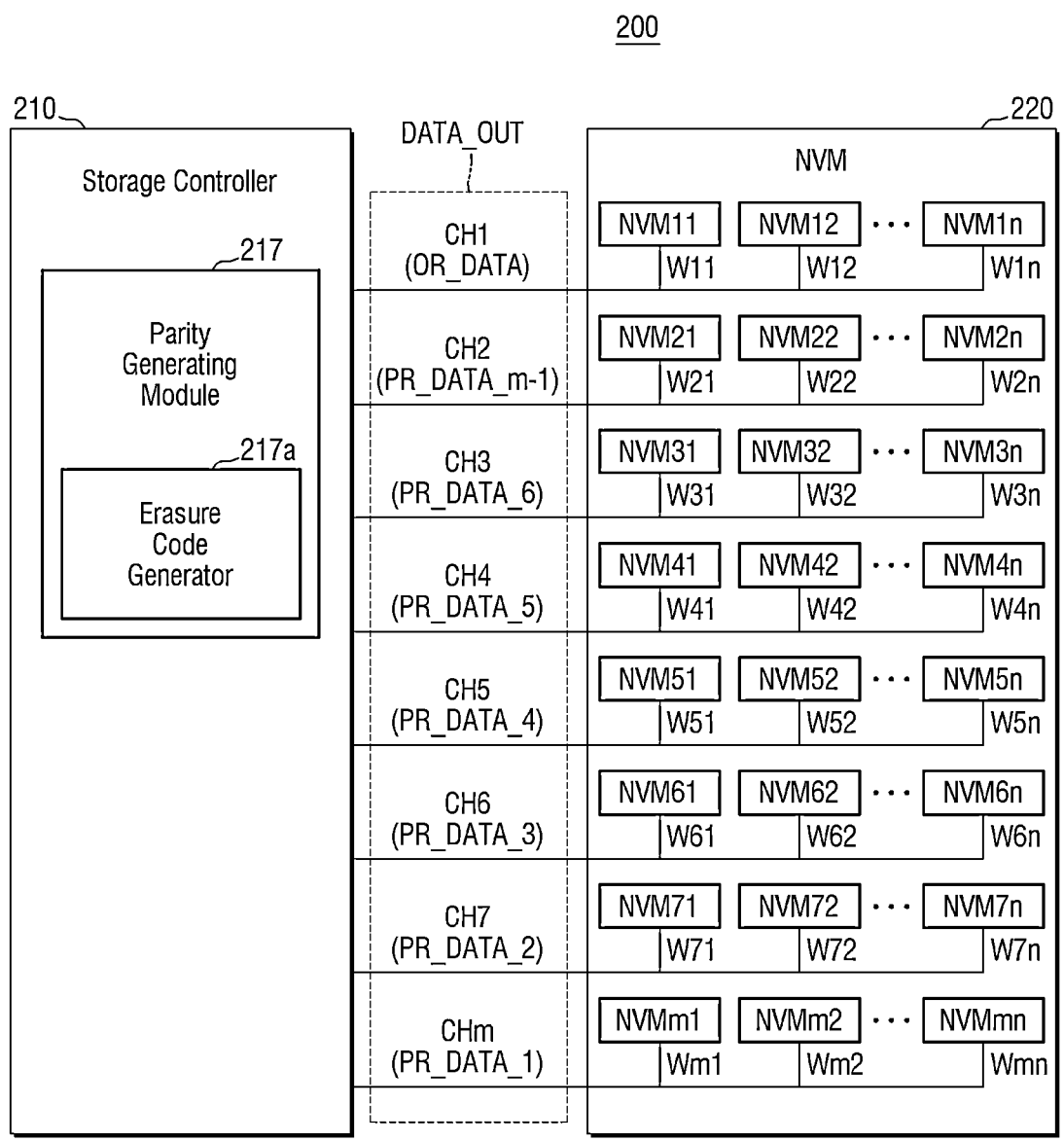
Figure 9:
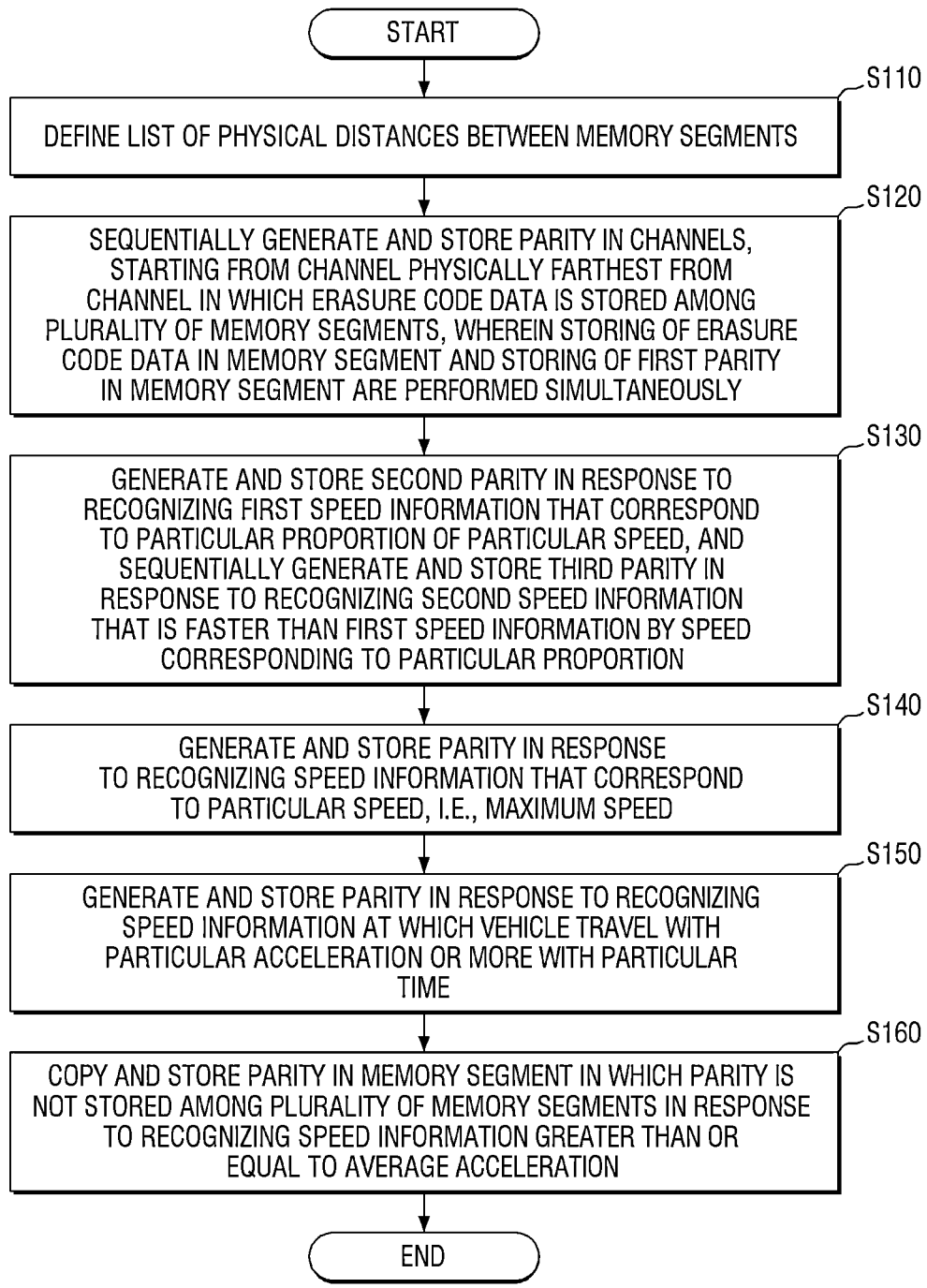
FIG. 9 is a diagram for describing an operation of a storage device according to some example embodiments of the present disclosure.

FIGS. 7 and 8 are diagrams for describing data stored in memory segments connected to (or associated with) a channel. The channel is between the storage controller and the NVM of FIG. 2 according to some example embodiments of the present disclosure. FIG. 9 is a diagram for describing an operation of a storage device according to some example embodiments of the present disclosure.

Referring to FIG. 7, the storage controller 210 generates parity PR_DATA according to the speed information received from the host 100 with respect to original data OR_DATA to be written to the NVM 220 and store the generated parity PR_DATA in a plurality memory segments connected to the channels CH. Specifically, the sensing module 219 may receive the speed information from the host 100, and the parity generator module 217 may generate the parity PR_DATA.

The storage controller 210 may acquire information on a physical distance between the plurality of channels CH. For example, the storage controller 210 may collect information on a physical distance between the first channel CH1 and the second channel CH2 and information on a physical distance between the first channel CH1 and a $m^{th}$ channel CHm, and define a list thereof.

The storage controller 210 may generate and store first parity PR_DATA_1 in the $m^{th}$ memory segment associated with the $m^{th}$ channel CHm that is physically farthest from the first channel CH1 among the plurality of channels CH associated with the first memory segment among the plurality of memory segments in which the original data OR_DATA is stored. In this case, the storing of the original data OR_DATA in the first memory segment and the storing of the first parity PR_DATA_1 in the $m^{th}$ memory segment may be simultaneously performed. For example, in stationary state of the vehicle 700 before driving, the first parity PR_DATA_1 may be stored in the $m^{th}$ memory segment.

The storage controller 210 may sequentially generate and store parity PR_DATA in the memory segments, starting from the $m^{th}$ memory segment that is associated with the $m^{th}$ channel which is physically farthest from the first channel CH1 associated with the first memory segment in which the original data OR_DATA is stored. Specifically, the first parity PR_DATA_1 may be generated in the $m^{th}$ channel CHm and a second parity PR_DATA_2 may be sequentially generated in a seventh channel CH7 that is an $(m-1)^{th}$ channel.

When speed information that corresponds to a particular proportion of a particular speed is recognized by the storage controller 210, the parity PR_DATA may be sequentially generated and stored in the plurality of memory segments. In this case, the particular speed, i.e., the maximum speed, may be defined by the host 100.

Specifically, when the sensing module 219 recognizes first speed information which indicates a speed that corresponds to a particular proportion of a particular speed, the parity generator module 217 may generate and store the second parity PR_DATA_2 in the seventh memory segment that is the $(m-1)^{th}$ memory segment. Thereafter, when the sensing module 219 recognizes second speed information that is faster than the first speed information by the speed corresponding to the particular proportion, the parity generator module 217 may sequentially generate and store a third parity PR_DATA_3 in a sixth memory segment that is an $(m-2)^{th}$ memory segment.

For example, assuming that the particular speed may be 100 km and the particular proportion is 10%, the first speed information may be 10 km and the second speed information may be 20 km. However, the inventive concepts of the present disclosure are not limited thereto.

In this case, when speed information indicating as speed corresponding to a particular speed, i.e., the maximum speed, parity may be generated 100%.

When the storage controller 210 recognizes speed information indicating an acceleration at which the vehicle 700 travels with a particular acceleration or more within a particular time, the parity PR_DATA may be generated and stored in the plurality of memory segments.

For example, the particular time may be 10 seconds and the particular acceleration may be an acceleration that corresponds to 30% of the average acceleration of the traveling vehicle 700. However, the inventive concepts of the present disclosure are not limited thereto.

When such speed information is recognized, the parity generator module 217 may sequentially generate and store the parity PR_DATA in the plurality of memory segments.

When the storage controller 210 recognizes speed information indicating an acceleration greater than or equal to the average acceleration of the traveling vehicle 700, the parity PR_DATA may be copied and stored in a memory segment in which the parity PR_DATA is not stored among the plurality of memory segments CH. Even when the traveling vehicle 700 stops or collides with another object, the parity PR_DATA may be copied and stored in a memory segment in which the parity PR_DATA is not stored among the plurality of memory segments.

The storage controller 210 may further include a host interface 211 configured to receive data to be written to the NVM 220 from the host 100 and transfer data read from the NVM 220. The storage controller 210 may further include a memory interface 212 configured to transfer data to be written to the NVM 220 to the NVM 220 or to receive data read from the NVM 220.

In this case, the amount of data DATA_OUT transferred and received by the memory interface 212 may be greater than the amount of data DATA_IN transferred and received by the host interface 211. That is, the parity PR_DATA is generated according to the speed information and the amount of data stored in the memory segment increases. Accordingly, the amount of data DATA_OUT transferred and received by the memory interface 212 may increase. Although not specifically illustrated, in this case, the amount of data DATA_OUT transferred and received may be detected for each of the plurality of memory segments.

In the storage device according to some example embodiments, the amount of parity generated increases according to information regarding a speed change sensed from the outside. As a result, when such a storage device is used in a vehicle, it is possible to safely store or restore data even in a state in which a traveling speed of the vehicle rapidly changes.

Referring to FIG. 8, the storage controller 210 may generate erasure code data ER_DATA by performing erasure coding on the original data OR_DATA. Specifically, the parity generator module 217 may generate the erasure code data ER_DATA.

For simplicity, the same components as those described with reference to FIG. 7 may not be redundantly described or may be briefly described.

The storage controller 210 may generate parity PR_DATA for the erasure code data ER_DATA according to the speed information transferred from the host 100 and store the generated parity PR_DATA in the plurality of memory segments.

Referring to FIGS. 8 and 9, the storage controller 210 may define information on a physical distance between the plurality of channels CH in S110. For example, the storage controller 210 may collect information on a physical distance between the first channel CH1 and the second channel CH2 and information on a physical distance between the first channel CH1 and the $m^{th}$ channel CHm, and define a list thereof.

The storage controller 210 may generate and store a first parity PR_DATA_1 in the $m^{th}$ memory segments associated with the $m^{th}$ channel CHm that is physically farthest from the first channel CH1 associated with the first memory segment in which the erasure code data ER_DATA is stored among the plurality of memory segments. In this case, the storing of the erasure code data ER_DATA in the first memory segment and the storing of the first parity PR_DATA_1 in the $m^{th}$ memory segments may be simultaneously performed in S120. For example, in stationary state of the vehicle 700 before driving, the first parity PR_DATA_1 may be stored in the $m^{TH}$ memory segments.

The storage controller 210 may sequentially generate and store parity PR_DATA in the memory segments, starting from the $m^{th}$ memory segments associated with the $m^{th}$ channel CHm that is physically farthest from the first channel CH1 associated with the first memory segments in which the erasure code data ER_DATA is stored. Specifically, the first parity PR_DATA_1 may be generated in the $m^{th}$ channel CHm and a second parity PR_DATA_2 may be sequentially generated in a seventh channel CH7 that is an $(m-1)^{th}$ channel.

When speed information that corresponds to a particular proportion of a particular speed is recognized by the storage controller 210, the parity PR_DATA for the erasure code data ER_DATA may be sequentially generated and stored in the plurality of memory segments.

Specifically, when the sensing module 219 recognizes first speed information that corresponds to a particular proportion of a particular speed, the parity generator module 217 may generate and store the second parity PR_DATA_2 for the erasure code data ER_DATA in the seventh memory segments that is the $(m-1)^{th}$ memory segments. Thereafter, when the sensing module 219 recognizes second speed information that is faster than the first speed information by the speed corresponding to the particular proportion, the parity generator module 217 may sequentially generate and store a third parity PR_DATA_3 for the erasure code data ER_DATA in a sixth memory segments in S130.

In this case, when speed information corresponding to a particular speed, i.e., the maximum speed, parity may be generated 100% and stored in S140.

When the storage controller 210 recognizes speed information at which the vehicle 700 travels with a particular acceleration or more within a particular time, the parity PR_DATA for the erasure code data ER_DATA may be generated and stored in the plurality of memory segments in S150.

Specifically, when the storage controller 210 recognizes the first speed information, the second parity PR_DATA_2 may be generated and stored in the seventh memory segments. Thereafter, when the second speed information that is faster than the first speed information is recognized, the parity generator module 217 may generate and store a third parity PR_DATA_3 for the erasure code data ER_DATA in the sixth memory segments. Then, when third speed information at which the vehicle 700 travels with a particular acceleration or more within a particular time is recognized, the parity generator module 217 may generate a fourth parity PR_DATA_4 for the erasure code data ER_DATA in a fifth memory segments.

When the storage controller 210 recognizes speed information greater than or equal to the average acceleration of the traveling vehicle 700, the parity PR_DATA may be copied and stored in memory segments in which the parity PR_DATA is not stored among the plurality of memory segments in S160. Even when the traveling vehicle 700 stops or collides with another object, the parity PR_DATA may be copied and stored in a memory segments in which the parity PR_DATA is not stored among the plurality of memory segments.

Specifically, when the storage controller 210 recognizes the first speed information, the second parity PR_DATA_2 may be generated and stored in the seventh memory segments. Then, when the second speed information that is faster than the first speed information is recognized, the parity generator module 217 may generate and copy the third parity PR_DATA_3 for the erasure code data ER_DATA to the sixth memory segments. Then, when the sensing module 219 recognizes the third speed information greater than or equal to the average acceleration, the parity generator module 217 may sequentially copy and store fourth to sixth parities PR_DATA_4, PR_DATA_5, and PR_DATA_6 in the fifth to third memory segments in which the first to third parities PR_DATA_1, PR_DATA_2, and PR_DATA_3 are not stored. In this case, the fourth to sixth parities PR_DATA_4, PR_DATA_5, and PR_DATA_6 are respectively copied from the first to third parities PR_DATA_1, PR_DATA_2, and PR_DATA_3, and may be sequentially generated and stored.

The storage controller 210 may further include a host interface 211 configured to receive data to be written to the NVM 220 from the host 100 and transfer data read from the NVM 220. The storage controller 210 may further include a memory interface 212 configured to transfer data to be written to the NVM 220 to the NVM 220 or to receive data read from the NVM 220.

In this case, the amount of data DATA_OUT transferred and received by the memory interface 212 may be greater than the amount of data transferred and received by the host interface 211. That is, the parity PR_DATA is generated according to the speed information and the amount of data stored in the memory segments increases. Accordingly, the amount of data DATA_OUT transferred and received by the memory interface 212 may increase. In this case, the amount of data DATA_OUT transferred and received may be detected for each of the plurality of channels CH and/or memory segments.

In the storage device according to some example embodiments, erasure code data may be generated with respect to original data and parity may be generated therefor. As a result, when such a storage device is used in a vehicle, it is possible to more efficiently manage data when parity is generated by reflecting the traveling speed of the vehicle.

Figure 10:
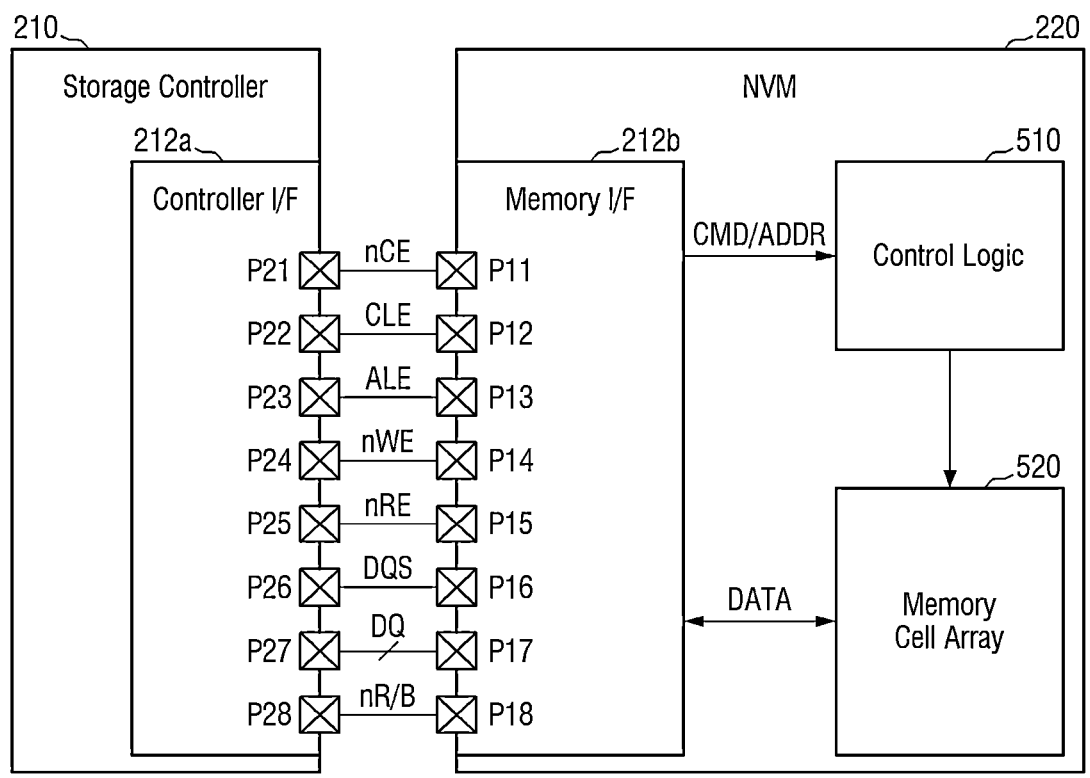
FIG. 10 is a diagram illustrating the storage controller, the host interface, the memory interface, and the NVM of FIG. 2.

FIG. 10 is a diagram illustrating the storage controller, the host interface, the memory interface, and the NVM of FIG. 2. The memory interface 212 of FIG. 2 may include a controller interface circuitry 212a.

The NVM 220 may include first to eight pins P11 to P18, a memory interface circuitry 212b, a control logic circuitry 510, and a memory cell array 520.

The memory interface circuitry 212b may receive a chip enable signal nCE from the storage controller 210 through the first pin P11. The memory interface circuitry 212b may transfer and receive signals to and from the storage controller 210 through the second to eighth pins P12 to P18 in response to the chip enable signal nCE. For example, when the chip enable signal nCE is in an enable state (e.g., a low level), the memory interface circuitry 212b may transfer and receive signals to and from the storage controller 210 through the second to eighth pins P12 to P18.

The memory interface circuitry 212b may receive a command latch enable signal CLE, an address latch enable signal ALE, and a write enable signal nWE from the storage controller 210 through the second to fourth pins P12 to P14. The memory interface circuitry 212b may receive a data signal DQ from the storage controller 210 through the seventh pin P17 or transfer the data signal DQ to the storage controller 210. A command CMD, an address ADDR, and data DATA may be transferred via the data signal DQ. For example, the data signal DQ may be transferred through a plurality of data signal lines. In this case, the seventh pin P17 may include a plurality of pins respectively corresponding to a plurality of data signals.

The memory interface circuitry 212b may obtain the command CMD from the data signal DQ, which is received in an enable section (e.g., a high-level state) of the command latch enable signal CLE based on toggle time points of the write enable signal nWE. The memory interface circuitry 212b may obtain the address ADDR from the data signal DQ, which is received in an enable section (e.g., a high-level state) of the address latch enable signal ALE based on the toggle time points of the write enable signal nWE.

In some example embodiments, the write enable signal nWE may be maintained at a static state (e.g., a high level or a low level) and toggle between the high level and the low level. For example, the write enable signal nWE may toggle in a section in which the command CMD or the address ADDR is transferred. Thus, the memory interface circuitry 212b may obtain the command CMD or the address ADDR based on toggle time points of the write enable signal nWE.

The memory interface circuitry 212b may receive a read enable signal nRE from the storage controller 210 through the fifth pin P15. The memory interface circuitry 212b may receive a data strobe signal DQS from the storage controller 210 through the sixth pin P16 or transfer the data strobe signal DQS to the storage controller 210.

In a data DATA output operation of the NVM 220, the memory interface circuitry 212b may receive the read enable signal nRE, which toggles through the fifth pin P15, before outputting the data DATA. The memory interface circuitry 212b may generate the data strobe signal DQS, which toggles based on the toggling of the read enable signal nRE. For example, the memory interface circuitry 212b may generate a data strobe signal DQS, which starts toggling after a predetermined delay (e.g., tDQSRE), based on a toggling start time of the read enable signal nRE. The memory interface circuitry 212b may transfer the data signal DQ including the data DATA based on a toggle time point of the data strobe signal DQS. Thus, the data DATA may be aligned with the toggle time point of the data strobe signal DQS and transferred to the storage controller 210.

In a data DATA input operation of the NVM 220, when the data signal DQ including the data DATA is received from the storage controller 210, the memory interface circuitry 212b may receive the data strobe signal DQS, which toggles, along with the data DATA from the storage controller 210. The memory interface circuitry 212b may obtain the data DATA from the data signal DQ based on a toggle time point of the data strobe signal DQS. For example, the memory interface circuitry 212b may sample the data signal DQ at rising and falling edges of the data strobe signal DQS and obtain the data DATA.

The memory interface circuitry 212b may transfer a ready/busy output signal nR/B to the storage controller 210 through the eighth pin P18. The memory interface circuitry 212b may transfer state information of the NVM 220 through the ready/busy output signal nR/B to the storage controller 210. When the NVM 220 is in a busy state (i.e., when operations are being performed in the NVM 220), the memory interface circuitry 212b may transfer a ready/busy output signal nR/B indicating the busy state to the storage controller 210. When the NVM 220 is in a ready state (i.e., when operations are not performed or completed in the NVM 220), the memory interface circuitry 212b may transfer a ready/busy output signal nR/B indicating the ready state to the storage controller 210.

For example, while the NVM 220 is reading data DATA from the memory cell array 520 in response to a page read command, the memory interface circuitry 212b may transfer a ready/busy output signal nR/B indicating a busy state (e.g., a low level) to the storage controller 210. For example, while the NVM 220 is programming data DATA to the memory cell array 520 in response to a program command, the memory interface circuitry 212b may transfer a ready/busy output signal nR/B indicating the busy state to the storage controller 210.

The control logic circuitry 510 may control overall operations of the NVM 220. The control logic circuitry 510 may receive the command/address CMD/ADDR obtained from the memory interface circuitry 212b. The control logic circuitry 510 may generate control signals for controlling other components of the NVM 220 in response to the received command/address CMD/ADDR. For example, the control logic circuitry 510 may generate various control signals for programming data DATA to the memory cell array 520 or reading the data DATA from the memory cell array 520.

The memory cell array 520 may store the data DATA obtained from the memory interface circuitry 212b, under the control of the control logic circuitry 510. The memory cell array 520 may output the stored data DATA to the memory interface circuitry 212b under the control of the control logic circuitry 510.

The memory cell array 520 may include a plurality of memory cells. For example, the plurality of memory cells may be flash memory cells. However, the present disclosure is not limited thereto, and the memory cells may be RRAM cells, FRAM cells, PRAM cells, thyristor RAM (TRAM) cells, or MRAM cells. Hereinafter, example embodiments in which the memory cells are NAND flash memory cells will mainly be described.

The storage controller 210 may include first to eighth pins P21 to P28 and a controller interface circuitry 212a. The first to eighth pins P21 to P28 may respectively correspond to the first to eighth pins P11 to P18 of the NVM 220.

The controller interface circuitry 212a may transfer a chip enable signal nCE to the NVM 220 through the first pin P21. The controller interface circuitry 212a may transfer and receive signals to and from the NVM 220, which is selected by the chip enable signal nCE, through the second to eighth pins P22 to P28.

The controller interface circuitry 212a may transfer the command latch enable signal CLE, the address latch enable signal ALE, and the write enable signal nWE to the NVM 220 through the second to fourth pins P22 to P24. The controller interface circuitry 212a may transfer or receive the data signal DQ to and from the NVM 220 through the seventh pin P27.

The controller interface circuitry 212a may transfer the data signal DQ including the command CMD or the address ADDR to the NVM 220 along with the write enable signal nWE which toggles. The controller interface circuitry 212a may transfer the data signal DQ including the command CMD to the NVM 220 by transferring a command latch enable signal CLE having an enable state. The controller interface circuitry 212a may transfer the data signal DQ including the address ADDR to the NVM 220 by transferring an address latch enable signal ALE having an enable state.

The controller interface circuitry 212a may transfer the read enable signal nRE to the NVM 220 through the fifth pin P25. The controller interface circuitry 212a may receive or transfer the data strobe signal DQS from or to the NVM 220 through the sixth pin P26.

In a data DATA output operation of the NVM 220, the controller interface circuitry 212a may generate a read enable signal nRE, which toggles, and transfer the read enable signal nRE to the NVM 220. For example, before outputting data DATA, the controller interface circuitry 212a may generate a read enable signal nRE, which is changed from a static state (e.g., a high level or a low level) to a toggling state. Thus, the NVM 220 may generate a data strobe signal DQS, which toggles, based on the read enable signal nRE. The controller interface circuitry 212a may receive the data signal DQ including the data DATA along with the data strobe signal DQS, which toggles, from the NVM 220. The controller interface circuitry 212a may obtain the data DATA from the data signal DQ based on a toggle time point of the data strobe signal DQS.

In a data DATA input operation of the NVM 220, the controller interface circuitry 212a may generate a data strobe signal DQS, which toggles. For example, before transferring data DATA, the controller interface circuitry 212a may generate a data strobe signal DQS, which is changed from a static state (e.g., a high level or a low level) to a toggling state. The controller interface circuitry 212a may transfer the data signal DQ including the data DATA to the NVM 220 based on toggle time points of the data strobe signal DQS.

The controller interface circuitry 212a may receive a ready/busy output signal nR/B from the NVM 220 through the eighth pin P28. The controller interface circuitry 212a may determine state information of the NVM 220 based on the ready/busy output signal nR/B.

Figure 11:
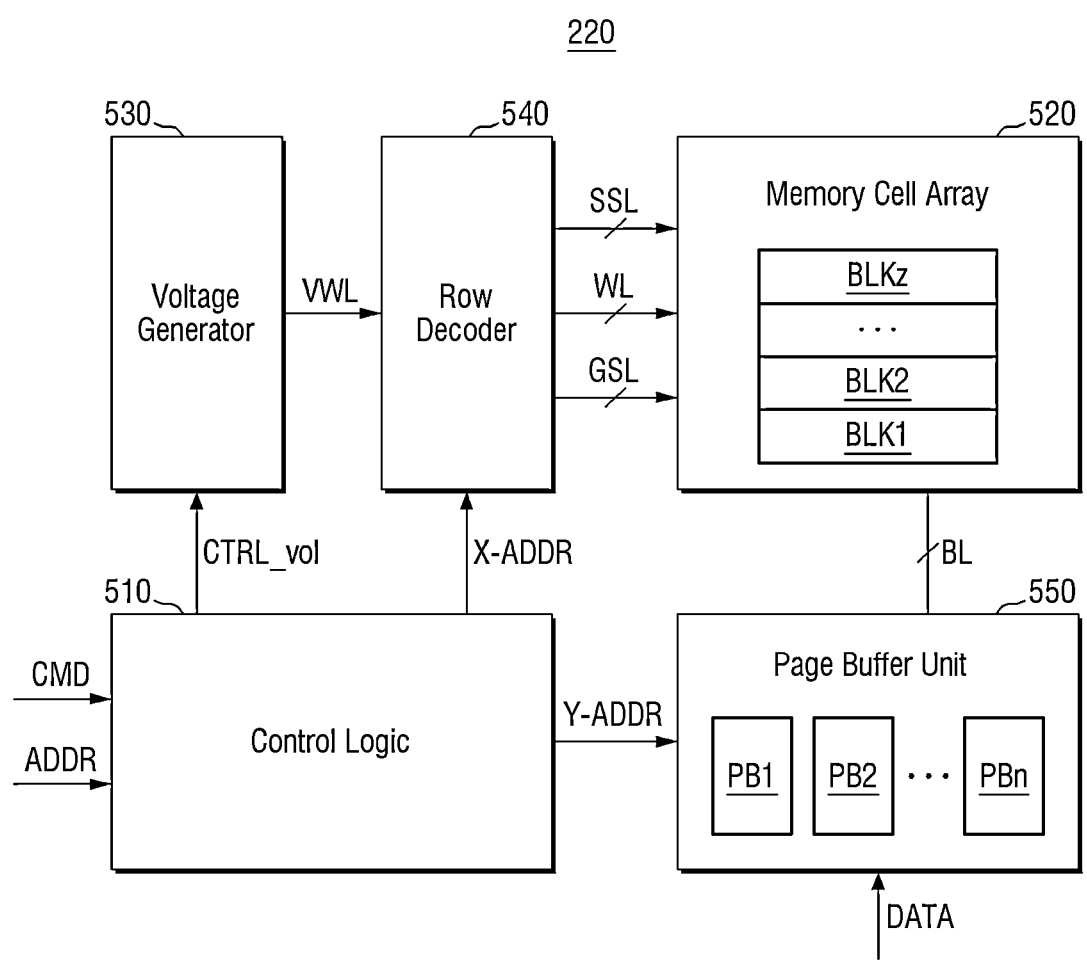
FIG. 11 is a block diagram illustrating the NVM of FIG. 2.

FIG. 11 is a block diagram illustrating the NVM of FIG. 2.

Referring to FIG. 11, the NVM 220 may include a control logic circuitry 510, a memory cell array 520, a page buffer unit 550, a voltage generator 530, and a row decoder 540. Although not shown in FIG. 11, the NVM 220 may further include a memory interface circuitry 212b shown in FIG. 10. In addition, the NVM 220 may further include a column logic, a pre-decoder, a temperature sensor, a command decoder, an address decoder, and the like.

The control logic circuitry 510 may control all various operations of the NVM 220. The control logic circuitry 510 may output various control signals in response to commands CMD and/or addresses ADDR from the memory interface circuitry 212b (see FIG. 3). For example, the control logic circuitry 510 may output a voltage control signal CTRL_vol, a row address X-ADDR, and a column address Y-ADDR.

The memory cell array 520 may include a plurality of memory blocks BLK1 to BLKz (here, z is a positive integer), each of which may include a plurality of memory cells. The memory cell array 520 may be connected to the page buffer unit 550 through bit lines BL and be connected to the row decoder 540 through word lines WL, string selection lines SSL, and ground selection lines GSL.

In an example embodiment, the memory cell array 520 may include a 3D memory cell array, which includes a plurality of NAND strings. Each of the NAND strings may include memory cells respectively connected to word lines vertically stacked on a substrate. In an example embodiment, the memory cell array 520 may include a 2D memory cell array, which includes a plurality of NAND strings arranged in a row direction and a column direction.

The page buffer unit 550 may include a plurality of page buffers PB1 to PBn (here, n is an integer greater than or equal to 3), which may be respectively connected to the memory cells through a plurality of bit lines BL. The page buffer unit 550 may select at least one of the bit lines BL in response to the column address Y-ADDR. The page buffer unit 340 may operate as a write driver or a sense amplifier according to an operation mode. For example, during a program operation, the page buffer unit 550 may apply a bit line voltage corresponding to data to be programmed, to the selected bit line. During a read operation, the page buffer unit 550 may sense current or a voltage of the selected bit line BL and sense data stored in the memory cell.

The voltage generator 530 may generate various kinds of voltages for program, read, and erase operations based on the voltage control signal CTRL_vol. For example, the voltage generator 530 may generate a program voltage, a read voltage, a program verification voltage, or an erase voltage as a word line voltage VWL.

The row decoder 540 may select one of a plurality of word lines WL and select one of a plurality of string selection lines SSL in response to the row address X-ADDR. For example, the row decoder 540 may apply the program voltage and the program verification voltage to the selected word line WL during a program operation and apply the read voltage to the selected word line WL during a read operation.

Figure 12:
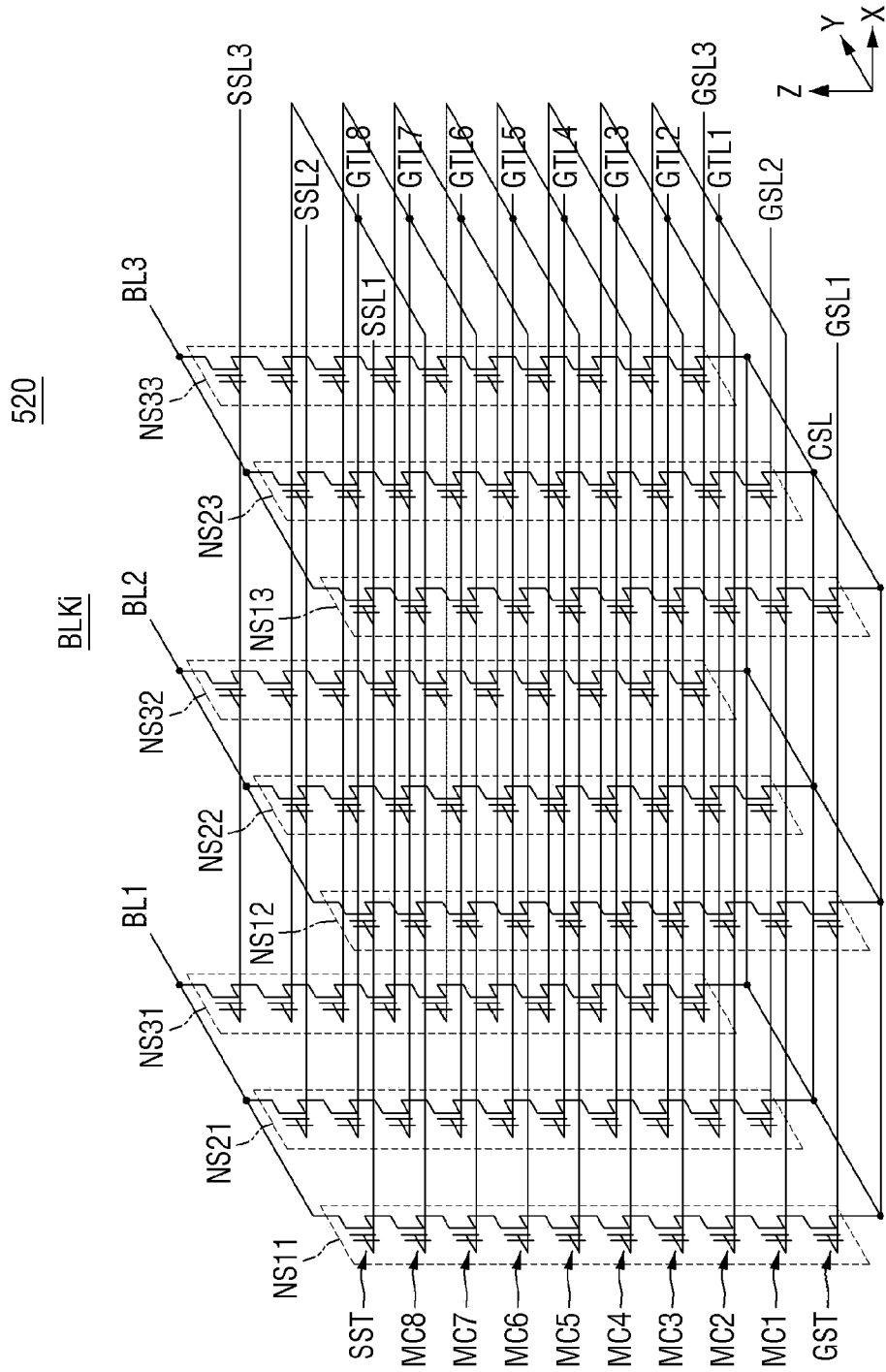
FIG. 12 is a diagram of a 3D V-NAND structure applicable to a NVM according to some example embodiments of the present disclosure.

FIG. 12 is a diagram of a 3D V-NAND structure applicable to a NVM according to some example embodiments of the present disclosure. When a storage module of a storage device is embodied as a 3D V-NAND flash memory, each of a plurality of memory blocks included in the storage module may be represented by an equivalent circuit shown in FIG. 12.

A memory block BLKi shown in FIG. 12 may refer to a 3D memory block having a 3D structure formed on a substrate. For example, a plurality of memory NAND strings included in the memory block BLKi may be formed in a vertical direction to a substrate.

Referring to FIG. 12, the memory block BLKi may include a plurality of memory NAND strings NS11 to NS33, which are connected between bit lines BL1, BL2, and BL3 and a common source line CSL. Each of the memory NAND strings NS11 to NS33 may include a string selection transistor SST, a plurality of memory cells e.g., MC1, MC2, . . . , and MC8, and a ground selection transistor GST. Each of the memory NAND strings NS11 to NS33 is illustrated as including eight memory cells MC1, MC2, . . . , and MC8 in FIG. 12, without being limited thereto.

The string selection transistor SST may be connected to string selection lines SSL1, SSL2, and SSL3 corresponding thereto. Each of the memory cells MC1, MC2, . . . , and MC8 may be connected to a corresponding one of gate lines GTL1, GTL2, ..., and GTL8. The gate lines GTL1, GTL2, ..., and GTL8 may respectively correspond to word lines, and some of the gate lines GTL1, GTL2, ..., and GTL8 may correspond to dummy word lines. The ground selection transistor GST may be connected to ground selection lines GSL1, GSL2, and GSL3 corresponding thereto. The string selection transistor SST may be connected to the bit lines BL1, BL2, and BL3 corresponding thereto, and the ground selection transistor GST may be connected to the common source line CSL.

Word lines (e.g., WL1) at the same level may be connected in common, and the ground selection lines GSL1, GSL2, and GSL3 and the string selection lines SSL1, SSL2, and SSL3 may be separated from each other. FIG. 12 illustrates an example in which a memory block BLK is connected to eight gate lines GTL1, GTL2, ..., and GTL8 and three bit lines BL1, BL2, and BL3, without being limited thereto.

Figure 13:
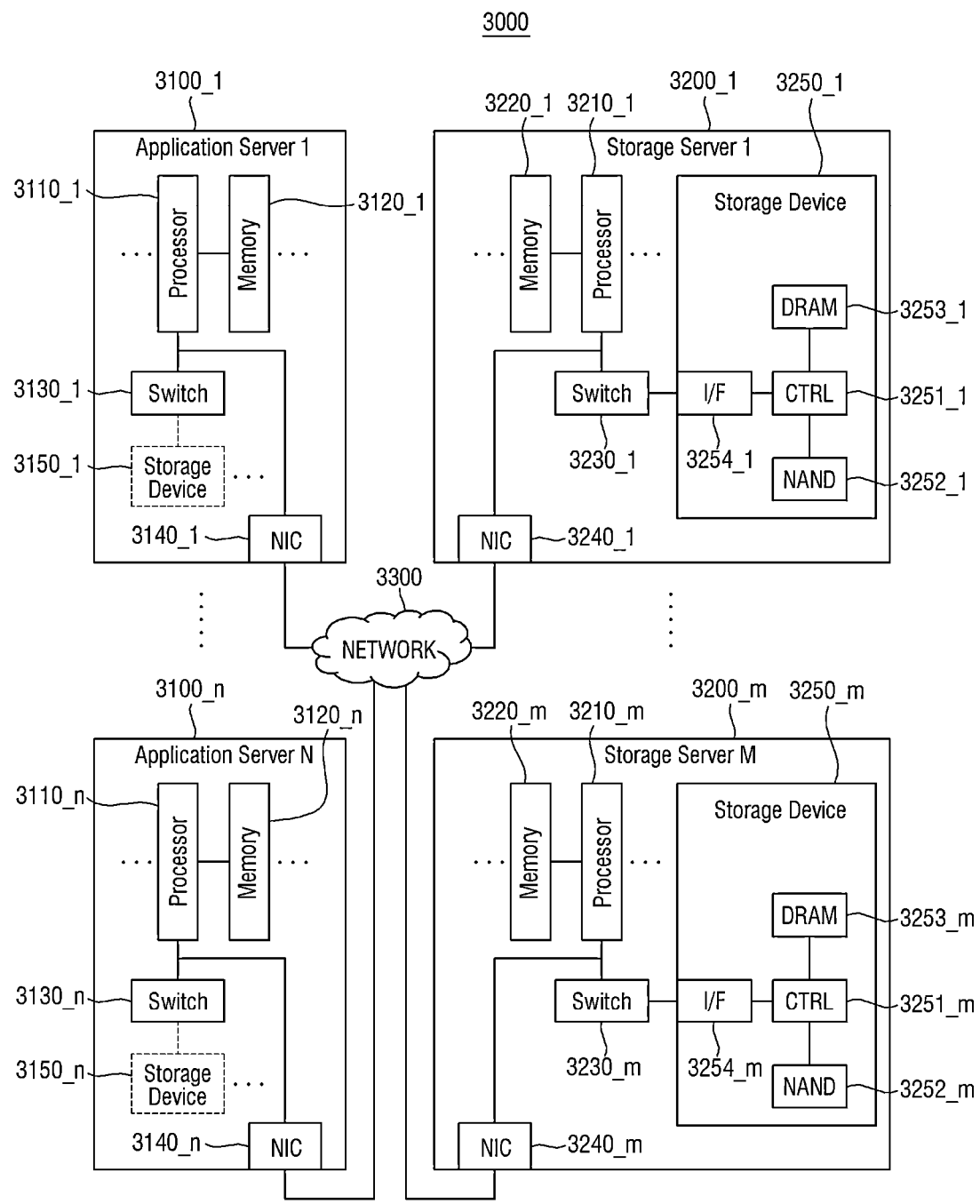
FIG. 13 is a diagram of a data center to which a storage device is applied according to some example embodiments of the present disclosure.

FIG. 13 is a diagram of a data center to which a storage device is applied according to some example embodiments of the present disclosure.

Referring to FIG. 13, a data center 3000 may be a facility that collects various types of data and provides various services, and may be referred to as a data storage center. The data center 3000 may be a system for operating search engines and databases and may be a computing system used by companies, such as banks or government agencies. The data center 3000 may include application servers 3100 to 3100n and storage servers 3200 to 3200m. The number of the application servers 3100 to 3100n and the number of the storage servers 3200 to 3200m may be variously selected according to example embodiments. The number of the application servers 3100 to 3100n and the number of the storage servers 3200 to 3200m may be different from each other.

The application server 3100 may include at least one processor 3110 and at least one memory 3120, and the storage server 3200 may include at least one processor 3210 and at least one memory 3220. An operation of the storage server 3200 will be described as an example. The processor 3210 may control overall operations of the storage server 3200, and may access the memory 3220 to execute instructions and/or data loaded in the memory 3220. The memory 3220 may include at least one of a double data rate (DDR) synchronous dynamic random access memory (SDRAM), a high bandwidth memory (HBM), a hybrid memory cube (HMC), a dual in-line memory module (DIMM), an Optane DIMM, a non-volatile DIMM (NVDIMM), etc. The number of the processors 3210 and the number of the memories 3220 included in the storage server 3200 may be variously selected according to example embodiments.

In one example embodiment, the processor 3210 and the memory 3220 may provide a processor-memory pair. In one example embodiment, the number of the processors 3210 and the number of the memories 3220 may be different from each other. The processor 3210 may include a single core processor or a multiple core processor. The above description of the storage server 3200 may be similarly applied to the application server 3100. In some example embodiments, the application server 3100 may not include the storage device 3150. The storage server 3200 may include at least one storage device 3250. The number of the storage devices 3250 included in the storage server 3200 may be variously selected according to example embodiments.

The application servers 3100 to 3100n and the storage servers 3200 to 3200m may communicate with each other through a network 3300. The network 3300 may be implemented using a fiber channel (FC) or an Ethernet. In this case, the FC may be a medium used for a relatively high speed data transmission, and an optical switch that provides high performance and/or high availability may be used. The storage servers 3200 to 3200m may be provided as file storages, block storages, or object storages according to an access scheme of the network 3300.

In one example embodiment, the network 3300 may be a storage-only network or a network dedicated to a storage, such as a storage area network (SAN). For example, the SAN may be an FC-SAN that uses an FC network and is implemented according to an FC protocol (FCP). For another example, the SAN may be an IP-SAN that uses a transmission control protocol/Internet protocol (TCP/IP) network and is implemented according to an iSCSI (a SCSI over TCP/IP or an Internet SCSI) protocol. In another example, the network 3300 may be a general or normal network such as the TCP/IP network. For example, the network 3300 may be implemented according to at least one of protocols, such as an FC over Ethernet (FCoE), a network attached storage (NAS), an NVMe over Fabrics (NVMe-oF), etc.

Hereinafter, a description will be given focusing on the application server 3100 and the storage server 3200. The description of the application server 3100 may be applied to the other application server 3100n, and the description of the storage server 3200 may be applied to the other storage server 3200m.

The application server 3100 may store data requested to be stored by a user or a client into one of the storage servers 3200 to 3200m through the network 3300. In addition, the application server 3100 may obtain data requested to be read by the user or the client from one of the storage servers 3200 to 3200m through the network 3300. For example, the application server 3100 may be implemented as a web server or a database management system (DBMS).

The application server 3100 may access a memory 3120n or a storage device 3150n included in the other application server 3100n through the network 3300, and/or may access the memories 3220 to 3220m or the storage devices 3250 to 3250m included in the storage servers 3200 to 3200m through the network 3300. Therefore, the application server 3100 may perform various operations on data stored in the application servers 3100 to 3100n and/or the storage servers 3200 to 3200m. For example, the application server 3100 may execute a command for moving or copying data between the application servers 3100 to 3100n and/or the storage servers 3200 to 3200m. The data may be transferred from the storage devices 3250 to 3250m of the storage servers 3200 to 3200m to the memories 3120 to 3120n of the application servers 3100 to 3100n directly or through the memories 3220 to 3220m of the storage servers 3200 to 3200m. For example, the data transferred through the network 3300 may be encrypted data for security or privacy.

In the storage server 3200, an interface 3254 may provide a physical connection between the processor 3210 and a controller 3251 and/or a physical connection between a network interface card (NIC) 3240 and the controller 3251. For example, the interface 3254 may be implemented based on a direct attached storage (DAS) scheme in which the storage device 3250 is directly connected with a dedicated cable. For example, the interface 3254 may be implemented based on at least one of various interface schemes, such as an advanced technology attachment (ATA), a serial ATA (SATA), an external SATA (e-SATA), a small computer system interface (SCSI), a serial attached SCSI (SAS), a peripheral component interconnection (PCI), a PCI express (PCIe), an NVMe, an IEEE 1394, a universal serial bus (USB), a secure digital (SD) card interface, a multi-media card (MMC) interface, an embedded MMC (eMMC) interface, a universal flash storage (UFS) interface, an embedded UFS (eUFS) interface, a compact flash (CF) card interface, etc.

The storage server 3200 may further include a switch 3230 and the NIC 3240. The switch 3230 may selectively connect the processor 3210 with the storage device 3250 or may selectively connect the NIC 3240 with the storage device 3250 under the control of the processor 3210.

In one example embodiment, the NIC 3240 may include a network interface card, a network adapter, or the like. The NIC 3240 may be connected to the network 3300 through a wired interface, a wireless interface, a Bluetooth interface, an optical interface, or the like. The NIC 3240 may further include an internal memory, a digital signal processor (DSP), a host bus interface, or the like, and may be connected to the processor 3210 and/or the switch 3230 through the host bus interface. The host bus interface may be implemented as one of the above-described examples of the interface 3254. In one example embodiment, the NIC 3240 may be integrated with at least one of the processor 3210, the switch 3230, or the storage device 3250.

In the storage servers 3200 to 3200*m* and/or the application servers 3100 to 3100*n*, the processor may transmit a command to the storage devices 3150 to 3150*n* and 3250 to 3250*m* or the memories 3120 to 3120*n* and 3220 to 3220*m* to program or read data. At this time, the data may be data in which an error is corrected by an ECC engine. For example, the data may be processed by a data bus inversion (DBI) or a data masking (DM), and may include a cyclic redundancy code (CRC) information. For example, the data may be encrypted data for security or privacy.

The storage devices 3150 to 3150*m* and 3250 to 3250*m* may transmit a control signal and command/address signals to NAND flash memory devices 3252 to 3252*m* in response to a read command received from the processor. When data is read from the NAND flash memory devices 3252 to 3252*m*, a read enable (RE) signal may be input as a data output control signal and may serve to output data to a DQ bus. A data strobe signal (DQS) may be generated using the RE signal. The command and address signals may be latched in a page buffer based on a rising edge or a falling edge of a write enable (WE) signal.

The controller 3251 may control the overall operations of the storage device 3250. In one example embodiment, the controller 3251 may include an SRAM. The controller 3251 may write data into the NAND flash memory device 3252 in response to a write command, or may read data from the NAND flash memory device 3252 in response to a read command. For example, the write command and/or the read command may be provided from the processor 3210 in the storage server 3200, the processor 3210*m* in the other storage server 3200*m*, or the processors 3110 and 3110*n* in the application servers 3100 and 3100*n*. A DRAM 3253 may temporarily store (e.g., may buffer) data to be written to the NAND flash memory device 3252 or data read from the NAND flash memory device 3252. Further, the DRAM 3253 may store metadata. The metadata may be data generated by the controller 3251 to manage user data or the NAND flash memory device 3252. The storage device 3250 may include a secure element (SE) for security or privacy.

In some example embodiments, the storage devices 3150 and 3250 may perform the operations described above. That is, the storage devices 3150 and 3250 may receive speed information from the host 100 through the sensing modules 219 included in the storage devices 3150 and 3250. According to the speed information, the parity generator module 217 may adjust the amount of parity PR_DATA generated in the channels CH.

Figure 14:
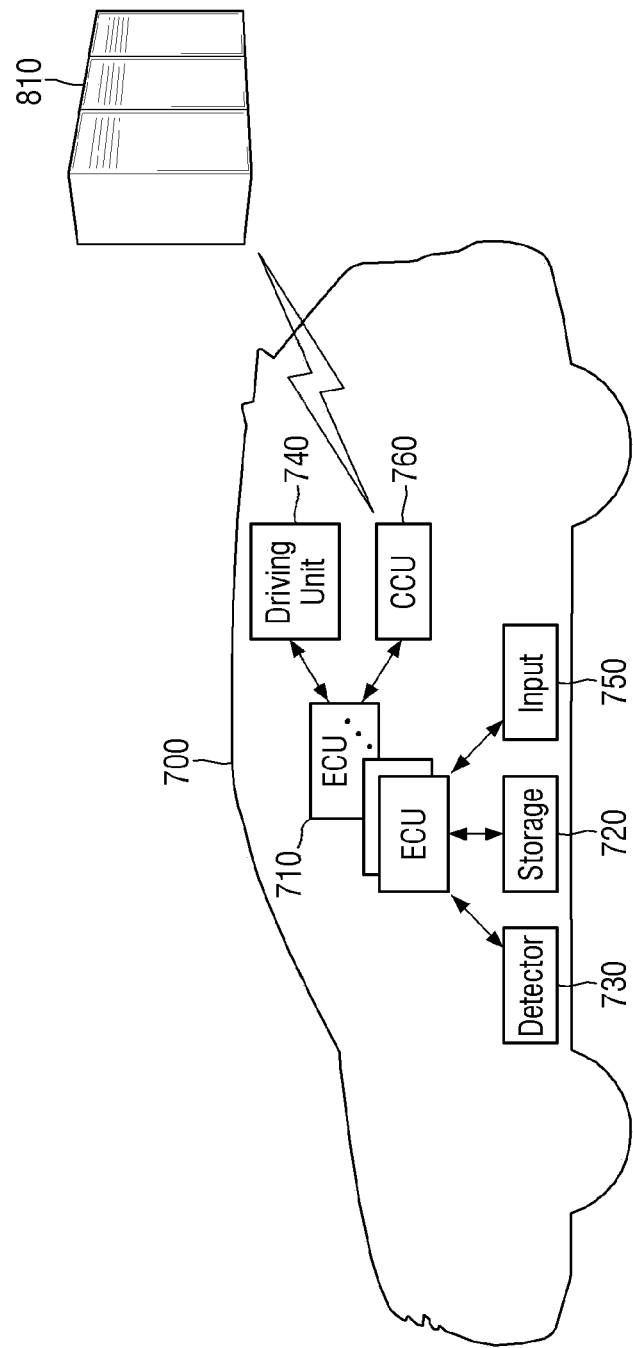
FIG. 14 is a diagram for describing a vehicle including a storage device according to some example embodiments of the present disclosure.

FIG. 14 is a diagram for describing a vehicle including a storage device according to some example embodiments of the present disclosure.

Referring to FIG. 14, the vehicle 700 may include a plurality of electronic control units (ECUs) 710 and the storage device 720. Here, the ECU 710 may correspond to the host device 100 described above, and the storage device 720 may correspond to the storage device 10 described above.

Each of the ECUs 710 may be electrically, mechanically, and communicatively connected to at least one of a plurality of devices provided in the vehicle 700 and may control an operation of the at least one device on the basis of any one function-performing command.

Here, the plurality of devices may include an acquisition device 730 configured to acquire information necessary for performing at least one function and a driving unit 740 configured to perform at least one function.

For example, the acquisition device 730 may include a variety of detectors and an image acquirer. The driving unit 740 may include a fan and a compressor of an air-conditioning system, a fan of a ventilation device, an engine and a motor of a power unit, a motor of a steering apparatus, a motor and a valve of a brake, an opening or closing device of a door or a tail gate, and the like.

The plurality of ECUs 710 may perform communication with the acquisition device 730 and the driving unit 740 by using, for example, at least one of Ethernet, low-voltage differential signaling (LVDS) communication, or local interconnect network (LIN) communication.

The plurality of ECUs 710 may determine whether performing of a function is necessary on the basis of information acquired by the acquisition device 730, and, when it is determined that performing of the function is necessary, may control an operation of the driving unit 740 which performs the corresponding function. In this case, the plurality of ECUs 710 may control an operation amount on the basis of the acquired information. At this time, the plurality of ECUs 710 may store the acquired information in the storage device 720 or read and use information stored in the storage device 720.

The plurality of ECUs 710 may control the operation of the driving unit 740, which performs the corresponding function, on the basis of a function performing command input through an input part 750. Also, the plurality of ECUs 710 may check a set amount corresponding to information input through the input part 750 and control the operation of the driving unit 740, which performs the corresponding function, on the basis of the checked set amount.

Each of the ECUs 710 may independently control any one function or may control any one function while being in connection with another ECU.

For example, the storage device according to some example embodiments may control a parity generator module to generate parity when information on a speed change acquired through a sensing module is greater than or equal to a particular speed determined by the ECU.

A connectivity control unit (CCU) 760 may be electrically, mechanically, and communicatively connected to each of the plurality of ECUs 710, and may communicate with each of the plurality of ECUs 710.

That is, the CCU 760 may directly communicate with the plurality of ECUs 710 provided in the vehicle, communicate with an external server, and communicate with an external terminal through an interface.

Here, the CCU 760 may communicate with the plurality of ECUs 710 and communicate with a server 810 using an antenna (not shown) and radio frequency (RF) communication. Also, the CCU 760 may communicate with the server 810 via wireless communication. Here, wireless communications between the CCU 760 and the server 810 may be performed through a variety of wireless communication schemes, such as global system for mobile communication (GSM), code division multiple access (CDMA), wideband code division multiple access (WCDMA), universal mobile telecommunications system (UMTS), time division multiple access (TDMA), long term evolution (LTE), and the like in addition to a wireless fidelity (WiFi) module and a wireless broadband (WiBro) module.

Additionally, the controller 1120, accelerator 1130, controllers 1200, host controller 110, and processor 213, and parity generating module 217 and/or the components included therein may include processor(s) and/or processing circuitry such as hardware including logic circuits; a hardware/software combination such as a processor executing software; or a combination thereof. For example, the processor(s) and/or processing circuitry may include, but is not limited to, a central processing unit (CPU), a memory controller, an arithmetic logic unit (ALU), a digital signal processor, a microcomputer, a field programmable gate array (FPGA), and programmable logic unit, a microprocessor, application-specific integrated circuit (ASIC), etc.

Processor(s), controller(s), and/or processing circuitry may be configured to perform actions or steps by being specifically programmed to perform those action or steps (such as with an FPGA or ASIC) or may be configured to perform actions or steps by executing instructions received from a memory, or a combination thereof.

While the inventive concepts have been particularly shown and described with reference to example embodiments thereof, it will be understood by those of ordinary skill in the art that various changes in form and details may be made therein without departing from the spirit and scope of the inventive concepts as defined by the following claims. It is therefore desired that the example embodiments be considered in all respects as illustrative and not restrictive, reference being made to the appended claims rather than the foregoing description to indicate the scope of inventive concepts.

What is claimed:

1. A storage device comprising:
   a non-volatile memory including a plurality of memory segments; and
   a storage controller connected to the non-volatile memory through a plurality of channels, each of the plurality of channels connected to a respective one of the plurality of memory segments such that each of the plurality of channels has a respective associated memory segment,
   wherein the storage controller is configured to generate parity according to speed information received from a host with respect to data to be written to the non-volatile memory and store the parity in at least one of plurality of memory segments via at least one of the plurality of channels.

2. The storage device of claim 1, wherein the storage controller is configured to acquire information on a distance between the plurality of channels.

3. The storage device of claim 1, wherein the storage controller is configured to generate and store a first parity in a farthest memory segment of the plurality of memory segments associated with a farthest channel of the plurality of channels that is farthest from a first channel of the plurality of channels associated with a first memory segment in which the is stored.

4. The storage device of claim 3, wherein storing of the data in the first memory segment and storing of the first parity in the farthest memory segment are performed simultaneously.

5. The storage device of claim 3, wherein the storage controller is configured to sequentially generate and store the parity in the plurality of memory segments, starting from the farthest memory segment.

6. The storage device of claim 1, wherein in response to the storage controller recognizing a first speed that corresponds to a particular proportion of a particular speed, the storage controller is configured to generate the parity sequentially and store the parity in the plurality of memory segments.

7. The storage device of claim 6, wherein in response to the storage controller recognizing speed information indicates a speed greater than or equal to the particular speed, the storage controller is configured to generate and store the parity in the plurality of memory segments.

8. The storage device of claim 1, wherein in response to the storage controller recognizing speed information indicating an acceleration greater than or equal to a particular acceleration within a particular time, the storage controller is configured to generate and store the parity in the plurality of memory segments.

9. The storage device of claim 1, wherein in response to the storage controller recognizing speed information indicating acceleration greater than or equal to an average acceleration, the storage controller is configured to copy and store the parity in a memory segment in which the parity is not stored among the plurality of memory segments.

10. The storage device of claim 1, wherein the storage controller is configured to
    generate erasure code data by performing erasure coding on the data,
    generate the parity according to the speed information transferred from the host with respect to the erasure code data, and
    store the parity in at least one of the plurality of memory segments.

11. The storage device of claim 1, wherein the storage controller comprises:
    a host interface configured to receive first data to be written to the non-volatile memory from the host and transfer second data read from the non-volatile memory to the host; and
    a memory interface configured to transfer third data to be written to the non-volatile memory to the non-volatile memory or receive fourth data read from the non-volatile memory,
    wherein the host interface and the memory interface are configured such that an amount of data transferred and received by the memory interface is greater than an amount of data transferred and received by the host interface.

12. A storage device comprising:
    a non-volatile memory including a plurality of memory segments; and
    a storage controller connected to the non-volatile memory through a plurality of channels, the storage controller being configured to acquire speed information and generate parity according to the speed information, each of the plurality of channels connected to a respective one of the plurality of memory segments such that each of the plurality of channels has a respective associated memory segment, wherein the storage controller is further configured to generate erasure code data by performing erasure coding on original data and to generate the parity according to the speed information with respect to the erasure code data and store the parity in at least one of the memory segments.

13. The storage device of claim 12, wherein the storage controller is configured to acquire information on a distance between the plurality of channels.

14. The storage device of claim 12, wherein the storage controller is configured to generate and store a first parity in an $n^{th}$ memory segment among the plurality of memory segments associated with an $n^{th}$ channel that is farthest from a first channel among the plurality of channels associated with a first memory segment among the plurality of memory segments in which the erasure code data is stored.

15. The storage device of claim 14, wherein the storage controller is configured to store the erasure code data in the first memory segment and store the first parity in the $n^{th}$ memory segment simultaneously.

16. The storage device of claim 14, wherein in response to the storage controller recognizing first speed information indicating a first speed that corresponds to a particular proportion of a particular speed, the storage controller is configured to generate and store a second parity in an $(n-1)^{th}$ memory segment among the plurality of memory segments, and in response to the storage controller recognizing second speed information that indicates a second speed faster than the first speed indicated by the first speed information by a speed corresponding to the particular proportion, the storage controller is configured to sequentially generate and store a third parity in an $(n-2)^{th}$ memory segments among the plurality of memory segments.

17. The storage device of claim 16, wherein in response to the storage controller recognizing speed information indicating a speed greater than or equal to the particular speed, the storage controller is configured to generate and store the parity in the plurality of channels.

18. The storage device of claim 12, wherein in response to the storage controller recognizing speed information indicating an acceleration greater than or equal to a particular acceleration within a particular time, the storage controller is configured to generate and store the parity in the plurality of memory segments.

19. The storage device of claim 12, wherein in response to the storage controller recognizing speed information indicating an acceleration greater than or equal to an average acceleration, the storage controller is configured to copy and store the parity in a memory segment in which the parity is not stored.

20. A storage device comprising:
a non-volatile memory including a plurality of memory segments; and
a storage controller connected to the non-volatile memory through a plurality of channels, each of the plurality of channels connected to a respective one of the plurality of memory segments such that each of the plurality of channels has a respective associated memory segment,
wherein the storage controller configured to receive speed information from a host and generate parity according to the speed information;
a host interface configured to receive first data to be written to the non-volatile memory from the host and transfer second data read from the non-volatile memory to the host; and
a memory interface configured to transfer third data to be written to the non-volatile memory or receive fourth data read from the non-volatile memory, wherein
the host interface and the memory interface are configured such that as a speed change included in the speed information increases, an amount of data transferred and received by the memory interface increases more than an amount of data transferred and received by the host interface.

* * * * *